US009265036B2

(12) United States Patent
Sorrentino et al.

(10) Patent No.: US 9,265,036 B2
(45) Date of Patent: Feb. 16, 2016

(54) SELECTION OF UPLINK CONTROL TRANSMISSION FORMAT PARAMETERS BASED ON CONTENT OF THE UPLINK CONTROL TRANSMISSION

(71) Applicant: Telefonaktiebolaget L M Ericsson (publ), Stockholm (SE)

(72) Inventors: Stefano Sorrentino, Solna (SE); Mattias Frenne, Uppsala (SE); Daniel Larsson, Vallentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 197 days.

(21) Appl. No.: 13/891,286

(22) Filed: May 10, 2013

(65) Prior Publication Data
US 2013/0301571 A1    Nov. 14, 2013

Related U.S. Application Data

(60) Provisional application No. 61/646,071, filed on May 11, 2012.

(51) Int. Cl.
*H04L 5/16*    (2006.01)
*H04W 72/04*    (2009.01)
(Continued)

(52) U.S. Cl.
CPC ......... *H04W 72/0413* (2013.01); *H04L 1/0025* (2013.01); *H04L 1/0088* (2013.01); *H04L 1/1896* (2013.01); *H04L 5/001* (2013.01); *H04L 5/0053* (2013.01); *H04W 28/18* (2013.01); *H04W 52/0216* (2013.01);
(Continued)

(58) Field of Classification Search
USPC .................. 370/203–280, 289–315, 328–335
See application file for complete search history.

(56) References Cited

U.S. PATENT DOCUMENTS 8,817,588 B2 *   8/2014  Luo et al. ...................... 370/203
2011/0243066 A1 * 10/2011 Nayeb Nazar et al. ....... 370/328
(Continued)

FOREIGN PATENT DOCUMENTS

EP    2424149 A2    2/2012
EP    2566088 A2    3/2013
(Continued)

OTHER PUBLICATIONS
3GPP TS 36.211, "3rd Generation Partnership Project; Technical Specification Group Radio Access Network; Evolved Universal Terrestrial Radio Access (E-UTRA); Physical Channels and Modulation (Release 10)," V10.0.0, Dec. 2010, 103 pages.
(Continued)

*Primary Examiner* — Man Phan
(74) *Attorney, Agent, or Firm* — Winthrow & Terranova, PLLC

(57) ABSTRACT

Systems and methods for transmitting uplink control signals in a cellular communications network are disclosed. In one embodiment, a wireless device configured to operate in a cellular communications network includes a radio subsystem and a processing subsystem. The processing subsystem selects a value for at least one parameter for an uplink control channel format based on content to be transmitted in an uplink control channel transmission according to the uplink control channel format. The processing subsystem then transmits, via the radio subsystem, the content in an uplink control channel transmission according to the uplink control channel format and the value for the at least one parameter for the uplink control channel format selected based on the content.

17 Claims, 24 Drawing Sheets

(51) Int. Cl.
| | |
|---|---|
| *H04L 5/00* | (2006.01) |
| *H04W 52/14* | (2009.01) |
| *H04W 52/32* | (2009.01) |
| *H04W 28/18* | (2009.01) |
| *H04W 52/02* | (2009.01) |
| *H04L 1/00* | (2006.01) |
| *H04L 1/18* | (2006.01) |
| *H04J 11/00* | (2006.01) |
| *H04W 52/24* | (2009.01) |
| *H04L 27/26* | (2006.01) |

(52) U.S. Cl.
CPC ......... *H04W 52/146* (2013.01); *H04W 52/325* (2013.01); *H04J 11/0053* (2013.01); *H04L 5/0016* (2013.01); *H04L 27/2636* (2013.01); *H04W 52/244* (2013.01)

(56) References Cited

U.S. PATENT DOCUMENTS

| | | | | |
|---|---|---|---|---|
| 2012/0039291 | A1* | 2/2012 | Kwon et al. | 370/329 |
| 2013/0044722 | A1* | 2/2013 | Kang et al. | 370/329 |
| 2013/0258884 | A1* | 10/2013 | Xu et al. | 370/252 |
| 2013/0308503 | A1* | 11/2013 | Kim et al. | 370/280 |
| 2013/0315188 | A1* | 11/2013 | Pajukoski et al. | 370/329 |
| 2013/0343316 | A1* | 12/2013 | Pajukoski et al. | 370/329 |
| 2014/0071864 | A1* | 3/2014 | Seo et al. | 370/294 |
| 2014/0233469 | A1* | 8/2014 | Seo et al. | 370/329 |

FOREIGN PATENT DOCUMENTS

| | | |
|---|---|---|
| WO | 2011136584 A2 | 11/2011 |
| WO | 2013148404 A1 | 10/2013 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol Specification (Release 10)," V10.5.0, Mar. 2012, 302 pages.

MCC Support, "3rd Generation Partnership Project: Chairman Notes: Final Report: (R1-123081)," 3rd Generation Partnership Project (3GPP TSG RAN WG1 Meeting #69), May 21-25, 2012, 123 pages, Czech Republic.

Nokia Siemens Networks, "3rd Generation Partnership Project: On UL CoMP Standardization Impact (R1-113148)", 3rd Generation Partnership Project (3GPP TSG RAN WG1 Meeting #66bis), Agenda Item: 7.5.4.1, Oct. 10-14, 2011, 2 pages, Zhuhai, China.

Intel Corporation, "3rd Generation Partnership Project: UL CoMP Control and Signaling Principles (R1-121525)", 3rd Generation Partnership Project (3GPP TSG-RAN WG1 #68bis), Agenda Item: 7.5.6.5, Mar. 26-30, 2012, 5 pages, Jeju, Korea.

Ericsson, "3rd Generation Partnership Project: Enhancements for UL Control Signaling (R1-122884)", 3rd Generation Partnership Project (3GPP TSG RAN WG1 Meeting #68bis), Agenda Item: 7.5.6.3, May 21-25, 2012, 3 pages, Prague, Czech Republic.

International Search Report and Written Opinion for PCT/IB2013/053809, mailed Jan. 28, 2014, 22 pages.

* cited by examiner

SELECTION OF UPLINK CONTROL TRANSMISSION FORMAT PARAMETERS BASED ON CONTENT OF THE UPLINK CONTROL TRANSMISSION

RELATED APPLICATIONS

This application claims the benefit of provisional patent application Ser. No. 61/646,071, filed May 11, 2012, the disclosure of which is hereby incorporated herein by reference in its entirety.

FIELD OF THE DISCLOSURE

The present disclosure relates to uplink control transmissions in a cellular communications network and, in some preferred embodiments, Physical Uplink Control Channel (PUCCH) transmissions in a $3^{rd}$ Generation Partnership Project (3GPP) Long Term Evolution (LTE) cellular communications network.

BACKGROUND $3^{rd}$ Generation Partnership Project (3GPP) Long Term Evolution (LTE) cellular communications networks utilize Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. As illustrated in FIG. 2, in the time domain, LTE downlink transmissions are organized into radio frames of 10 milliseconds (ms), where each radio frame consists of ten equally-sized subframes of length $T_{subframe}=1$ ms. Each subframe includes two slots of 0.5 ms. Furthermore, resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled. More specifically, in each subframe of the downlink from a base station, the base station transmits control information about to which terminals data is transmitted and upon which resource blocks the data is transmitted in the subframe. This control signaling is typically transmitted in the first 1, 2, 3, or 4 OFDM symbols in each subframe of the downlink. A downlink subframe with three OFDM symbols as control is illustrated in FIG. 3.

LTE utilizes a Hybrid Automatic Repeat Request (HARQ) scheme in the downlink. More specifically, a base station transmits data to a terminal in a subframe of the downlink. At the terminal, after receiving data in the subframe, the terminal attempts to decode the data and then reports to the base station whether the decoding was successful (ACK) or unsuccessful (NAK). In case of an unsuccessful decoding attempt, the base station can retransmit the data.

In LTE, uplink control signaling from the terminal to the base station consists of: HARQ acknowledgements for received downlink data; channel status reports to report downlink channel conditions, which are used for downlink scheduling; and uplink scheduling requests indicating that the terminal needs uplink resources for uplink data transmissions. If the terminal has not been assigned an uplink resource for data transmission, L1/L2 control information (i.e., channel status reports, HARQ acknowledgments (ACKs/NAKs), and uplink scheduling requests) is transmitted in uplink resources (resource blocks) specifically assigned for uplink L1/L2 control on the Physical Uplink Control Channel (PUCCH).

As illustrated in FIG. 4, the uplink resources allocated to L1/L2 control information on the PUCCH are located at the edges of the total available cell bandwidth. Each of these uplink resources consists of 12 subcarriers (one resource block) within each of the two slots of an uplink subframe. In order to provide frequency diversity, these frequency resources are frequency hopping on the slot boundary, i.e., one uplink resource consists of 12 subcarriers at the upper part of the spectrum within the first slot of a subframe and an equally sized resource at the lower part of the spectrum during the second slot of the subframe or vice versa. If more uplink resources are needed for the uplink L1/L2 control signaling, e.g., in case of very large overall transmission bandwidth supporting a large number of users, additional uplink resources blocks can be assigned next to the previously assigned uplink resource blocks. The reasons for locating the PUCCH resources at the edges of the overall available spectrum are two-fold, namely: (1) together with the frequency hopping described above, locating the uplink resources for the PUCCH at the edges of the overall available spectrum maximizes the frequency diversity experienced by the L1/L2 control signaling and (2) assigning the uplink resources for the PUCCH at other positions within the spectrum, i.e., not at the edges, would fragment the uplink spectrum, making it impossible to assign very wide transmission bandwidths to a single mobile terminal and still retain the single-carrier property of the uplink transmission.

The bandwidth of one PUCCH resource block during one subframe is too large for the control signaling needs of a single terminal. Therefore, to efficiently exploit the PUCCH resources set aside for control signaling, PUCCH transmissions from multiple terminals can share the same PUCCH resource block. More specifically, PUCCH transmissions from multiple terminals can be multiplexed onto the same PUCCH resource block by assigning the terminals different orthogonal phase rotations of a cell-specific length-12 frequency-domain sequence, which is referred to as a base sequence. A linear phase rotation in the frequency domain is equivalent to applying a cyclic shift in the time domain. Thus, although the term "phase rotation" is sometimes used herein, the term "cyclic shift" is also used with an implicit reference to the time domain.

The resource used by a PUCCH transmission is therefore not only specified in the time-frequency domain by the resource-block pair, but also by the phase rotation applied to the base sequence. Similarly to the case of reference signals, there are up to 12 different phase rotations specified, providing up to 12 different orthogonal sequences from each cell-specific base sequence. However, in the case of frequency-selective channels, not all the 12 phase rotations can be used if orthogonality is to be retained. Typically, up to six phase rotations are considered usable in a cell.

As mentioned above, uplink L1/L2 control signaling includes HARQ acknowledgements, channel status reports, and uplink scheduling requests. These different types of messages and combinations thereof are transmitted using different PUCCH formats. There are generally two different PUCCH formats defined for LTE. The first PUCCH format is PUCCH format 1. In general, PUCCH format 1 can be used to transmit a HARQ acknowledgement (ACK/NACK) and/or an uplink scheduling request. A HARQ acknowledgement is used to acknowledge the reception of one (or two in case of spatial multiplexing) transport blocks in the downlink. An uplink scheduling request is used to request resources for uplink data transmission. Obviously, a scheduling request should only be transmitted when the terminal is requesting resources, otherwise the terminal should be silent in order to save battery resources and not create unnecessary interference. Hence, unlike a HARQ acknowledgement, no explicit information bit is transmitted by a scheduling request. Rather, the scheduling request is instead conveyed by the presence (or absence) of energy on the corresponding PUCCH resource. However, uplink scheduling requests, although used for a completely different purpose, share the same PUCCH format as HARQ acknowledgements. This PUCCH format is referred to as PUCCH format 1 in the LTE specifications.

As illustrated in FIG. 5, PUCCH format 1 uses the same structure in the two slots of a subframe. For transmission of a HARQ acknowledgement, the single HARQ acknowledgement bit is used to generate a Binary Phase Shift Keying (BPSK) symbol (in case of downlink spatial multiplexing the two acknowledgement bits are used to generate a Quadrature Phase Shift Keying (QPSK) symbol). On the other hand, for a scheduling request, the BPSK/QPSK symbol is replaced by a constellation node treated as a negative acknowledgement (NACK) at the base station. The modulation symbol is then used in combination with a length-12 phase-rotated sequence (i.e., a phase-rotated base sequence) and an Orthogonal Cover Code (OCC) (i.e., the length-4 and length-3 sequences) to generate the signal to be transmitted in each of the two PUCCH slots.

A resource used for a PUCCH format 1 transmission for either a HARQ acknowledgement or a scheduling request is represented by a single scalar resource index. From the resource index, the phase rotation for the base sequence and the OCC are derived. For a HARQ acknowledgement, the resource index to use for transmission of the HARQ acknowledgement is given implicitly by the downlink control signaling used to schedule the corresponding downlink transmission to the terminal. Thus, the resources used for HARQ acknowledgements vary dynamically and depend on the Physical Downlink Control Channel (PDCCH) used to schedule the terminal in each subframe. In addition to dynamic scheduling HARQ acknowledgements based on the PDCCH, HARQ acknowledgements may be semi-persistently scheduled. More specifically, downlink transmissions to a terminal may be semi-scheduled using a semi-persistent scheduling pattern. In this case, configuration of the semi-persistent scheduling pattern includes information on the PUCCH index to use for the corresponding HARQ acknowledgements. In a similar manner, configuration information informs the terminal of the PUCCH resource to use for transmission of scheduling requests.

Thus, to summarize, PUCCH format 1 resources are split into two parts, namely, a semi-static part and a dynamic part. The semi-static part is used for uplink scheduling requests and HARQ acknowledgements for semi-persistently scheduled downlink transmissions. The amount of resources used for the semi-static part of PUCCH format 1 resources does not vary dynamically. The dynamic part is used for dynamically scheduled terminals. As the number of dynamically scheduled terminals varies, the amount of resources used for the dynamic PUCCH format 1 resources varies.

In addition to PUCCH format 1, a second PUCCH format, PUCCH format 2, is defined for LTE. PUCCH format 2 is used to transmit channel status reports. Channel status reports are generated by the terminal and provided to the base station in order to provide an estimate of downlink channel properties at the terminal. The channel status reports are utilized by the base station to aid in channel-dependent scheduling. A channel status report consists of multiple bits per subframe. PUCCH format 1, which is capable of at most two bits of information per subframe, can obviously not be used for this purpose. As such, transmission of channel status reports on the PUCCH is instead handled by PUCCH format 2, which is capable of multiple information bits per subframe.

PUCCH format 2 is illustrated in FIG. 6 for normal cyclic prefix. Like PUCCH format 1, PUCCH format 2 is based on a phase rotation of the same cell-specific base sequence as used for PUCCH format 1. Similarly to PUCCH format 1, a resource used for a PUCCH format 2 transmission can be represented by a resource index. The phase rotation and other parameters for PUCCH format 2 can then be derived from the resource index. The PUCCH format 2 resources are semi-statically configured.

The signals described above for both PUCCH format 1 and PUCCH format 2 are, as already explained, transmitted on a resource-block pair with one resource block in each slot. The resource-block pair to use for a particular PUCCH transmission is determined from the PUCCH resource index. Thus, the resource-block number to use in the first and second slot of a subframe can be expressed as:

$$RB\text{number}(i)=f(\text{PUCCH index},i)$$

where i is the slot number (0 or 1) within the subframe and f is a function found in the LTE specification.

Multiple resource-block pairs can be used to increase the control-signaling capacity. When one resource-block pair is full, the next PUCCH resource index is mapped to the next resource-block pair in sequence. The mapping is in principle done such that PUCCH format 2 (channel status reports) is transmitted closest to the edges of the uplink cell bandwidth with the semi-static part of PUCCH format 1 next and finally the dynamic part of PUCCH format 1 in the innermost part of the bandwidth. Three semi-statically parameters are used to determine the resources to use for the different PUCCH formats, namely: (1) $N_{RB}^{(2)}$, which is provided as part of the system information, controls the resource-block pair on which the mapping of PUCCH format 1 begins, (2) $N_{PUCCH}^{(1)}$ controls the split between the semi-static and the dynamic part of PUCCH format 1, and (3) X controls the mix of PUCCH format 1 and PUCCH format 2 in one resource block. In most cases, the configuration is done such that the two PUCCH formats are mapped to separate sets of resource blocks, but there is also a possibility to have the border between PUCCH format 1 and PUCCH format 2 within a single resource block. The PUCCH resource allocation in terms of resource blocks are illustrated in FIG. 7. The numbers 0, 1, 2, . . . represent the order in which the resource blocks are allocated to PUCCH, i.e., a large PUCCH configuration may need resources 0-6 while a small configuration may use only 0.

Thus far, the discussion has focused on PUCCH for a single carrier bandwidth. Starting in LTE Rel-10, LTE supports bandwidths larger than 20 megahertz (MHz). In order to assure backward compatibility with LTE Rel-8 which supports a single bandwidth up to 20 MHz, starting with LTE Rel-10, a carrier having a bandwidth that is larger than 20 MHz appears as a number of LTE carriers to an LTE Rel-8 terminal using Carrier Aggregation (CA). CA is illustrated in FIG. 8. Each carrier in an aggregated bandwidth is referred to as a Component Carrier (CC). CA implies that an LTE Rel-10 or later terminal can receive multiple CCs, where the CCs have, or at least have the possibility to have, the same structure as an LTE Rel-8 carrier. The number of aggregated CCs as well as the bandwidth of the individual CCs may be different for uplink and downlink. A symmetric configuration refers to the case where the number of CCs in downlink and uplink is the same whereas an asymmetric configuration refers to the case where the number of CCs is different. It is important to note that the number of CCs configured in the network may be different from the number of CCs seen by a terminal. A terminal may, for example, support more downlink CCs than uplink CCs, even though the network offers the same number of uplink and downlink CCs.

During initial access, an LTE Rel-10 terminal behaves similar to an LTE Rel-8 terminal. Upon successful connection to the network, a terminal may, depending on its own capabilities and the network, be configured with additional CCs in the uplink and the downlink. Configuration is based on Radio Resource Control (RRC) signaling. Due to the heavy signaling and the rather slow speed of RRC signaling, a terminal may be configured with multiple CCs even though not all of them are currently used. A terminal configured on multiple CCs implies the terminal has to monitor all downlink CCs for the PDCCH and Physical Downlink Shared Channel (PDSCH). This implies a wider receiver bandwidth, higher sampling rates, etc. resulting in high power consumption.

To mitigate the above problems, LTE Rel-10 supports activation of CCs in addition to configuration of CCs. The terminal monitors only configured and activated CCs for PDCCH and PDSCH. Alternatively, LTE Rel-11 terminals may monitor an enhanced PDCCH (ePDCCH), which is only detectable by LTE Rel-11 terminals and beyond. Since activation is based on Media Access Control (MAC) elements, which are faster than RRC signaling, activation/deactivation can follow the number of CCs that is required to fulfill the current data rate needs. Upon arrival of large data amounts, multiple CCs are activated, used for data transmission, and deactivated if no longer needed. All but one CC, the DL Primary CC (DL PCC), can be deactivated. Therefore, activation provides the possibility to configure multiple CCs but only activate them on an as needed basis. Most of the time, a terminal has one or very few CCs activated, resulting in a lower reception bandwidth and thus battery consumption.

Scheduling of a CC is done on the PDCCH or ePDCCH via downlink assignments. Control information on the PDCCH or ePDCCH is formatted as a Downlink Control Information (DCI) message. In LTE Rel-8, a terminal only operates with one downlink and one uplink CC, and the association between downlink assignment, uplink grants, and the corresponding downlink and uplink CCs is therefore clear. However, in LTE Rel-10, two modes of carrier aggregation need to be distinguished. The first mode is very similar to the operation of multiple LTE Rel-8 terminals where a downlink assignment or uplink grant contained in a DCI message transmitted on a CC is either valid for the downlink CC itself or for associated (either via cell-specific or terminal specific linking) uplink CC. The second mode of operation augments a DCI message with a Carrier Indicator Field (CIF). A DCI containing a downlink assignment with a CIF is valid for that downlink CC indicted with the CIF and a DCI containing an uplink grant with a CIF is valid for the indicated uplink CC.

DCI messages for downlink assignments contain, among other things, resource block assignments, modulation and coding scheme related parameters, HARQ redundancy version, etc. denoted as DCI format Information Elements (IEs). In addition to those parameters that relate to the actual downlink transmission, most DCI formats for downlink assignments also contain an IE which is a bit field for Transmit Power Control (TPC) commands. These TPC commands are used to control the uplink power control behavior of the corresponding PUCCH that is used to transmit the HARQ feedback.

PUCCH transmission with carrier aggregation is performed somewhat differently that PUCCH transmission for a single carrier. From a terminal perspective, both symmetric and asymmetric uplink/downlink CC configurations are supported. For some of the configurations, one may consider the possibility to transmit the uplink control information on multiple PUCCH or multiple uplink CCs. However, this option is likely to result in higher power consumption at the terminal and a dependency on specific terminal capabilities. It may also create implementation issues due to inter-modulation products, and would lead to generally higher complexity for implementation and testing. Therefore, the transmission of PUCCH should have no dependency on the uplink/downlink CC configuration, i.e., as a design principle all uplink control information for a terminal is transmitted on a single uplink CC. In the case of PUCCH, the single uplink CC used for CA PUCCH is the semi-statically configured and terminal specific Uplink Primary CC (UL PCC), which is referred to as an anchor carrier.

Terminals only configured with a single downlink CC (which is then the DL PCC) and a single uplink CC (which is then the UL PCC) transmit HARQ acknowledgements on dynamically scheduled PUCCH resources according to LTE Rel-8. In this case, the first Control Channel Element (CCE) used to transmit PDCCH for the downlink assignment determines the dynamic PUCCH resource for a corresponding HARQ acknowledgement. If only one downlink CC is cell-specifically linked with the UL PCC, no PUCCH collisions can occur since all PDCCHs are transmitted using different first CCEs.

In a cell asymmetric carrier aggregation scenario or for other reasons, multiple downlink CCs may be cell-specifically linked with the same uplink CC. Terminals configured with same uplink CC but with different downlink CCs (with any of the downlink CCs that are cell-specifically linked with the uplink CC) share the same UL PCC but have different DL PCCs. Terminals receiving their downlink assignments from different downlink CCs will transmit their HARQ feedback on the same uplink CC. It is up to base station scheduling to ensure that no PUCCH collisions occur. However, at least in LTE Rel-10, a terminal cannot be configured with more uplink CCs than downlink CCs.

This concept can be extended even to terminals which have multiple downlink CCs configured. Each PDCCH or ePDCCH transmitted on the DL PCC has, according to LTE Rel-8, a PUCCH resource reserved on the UL PCC. Even though a terminal is configured with multiple downlink CCs but only receives a DL PCC assignment it should still use the LTE Rel-8 PUCCH resource on the UL PCC. The alternative would be to also use, for a single DL PCC assignment, a PUCCH format that enables feedback of HARQ bits corresponding to the number of configured CCs (which is referred to herein as CA PUCCH). Since configuration is a rather slow process and a terminal may be often configured with multiple CCs even though only the DL PCC is active and used, this would lead to a very inefficient usage of CA PUCCH resources.

Upon reception of downlink assignments on a single Secondary CC (SCC) or reception of multiple downlink assignments, CA PUCCH should be used. While in the latter case it is obvious to use CA PUCCH because only CA PUCCH supports feedback of HARQ bits of multiple CCs, it is less clear to also use CA PUCCH in the first case. A downlink SCC assignment alone is not typical. The base station scheduler should strive to schedule a single downlink CC assignment on the DL PCC and try to deactivate all SCCs if not needed. Another issue is that PDCCH for a downlink SCC assignment is transmitted on the SCC (assuming CIF is not configured) and, hence, there is no automatically reserved LTE Rel-8 PUCCH resource on the uplink PCC. Using the LTE Rel-8 PUCCH for stand-alone downlink SCC assignments would require reserving LTE Rel-8 resources on the uplink PCC for any downlink CC that is configured by any terminal using this UL PCC. Since stand-alone SCC assignments are atypical, this would lead to an unnecessary over provisioning of LTE Rel-8 PUCCH resources on the UL PCC.

Also, a possible error case that may occur is that the base station schedules a terminal on multiple downlink CCs including the DL PCC. If the terminal misses all but the DL PCC assignment, the terminal will use LTE Rel-8 PUCCH instead of CA PUCCH. To detect this error case, the base station has to monitor both the LTE Rel-8 PUCCH and the CA PUCCH.

Depending on the number of actually received downlink assignments, the terminal has to provide a corresponding number of HARQ acknowledgements (i.e., a corresponding number of HARQ feedback bits). In a first case, the terminal could adopt the CA PUCCH format according to the number of received assignments and provide feedback accordingly. However, PDCCH with downlink assignments can get lost. Therefore, adopting a CA PUCCH format according to the number of received downlink assignments is ambiguous and would require testing of many different hypotheses at the base station. Alternatively, the CA PUCCH format could be set or included in an activation message. It has been decided that activation/deactivation of CCs is done with MAC control elements and per-CC activation/deactivation is to be supported in LTE Rel-10 and beyond. MAC signaling and especially the HARQ acknowledgement indicating whether the activation command has been received successfully is error prone. Also, this approach requires testing of multiple hypotheses at the base station. Therefore, basing the CA PUCCH format on the number of configured CCs appears to be the safest choice. Configuration of CCs is based on RRC signaling. After successful reception/application of a new CC configuration, a confirmation message is sent back, which makes RRC signaling very safe.

The CA PUCCH can be transmitted in two different ways. The first method is based on the use of PUCCH format 3, which is based on Discrete Fourier Transform Spread (DFTS)-OFDM. PUCCH format 3 is illustrated in FIG. 9. FIG. 10 illustrates the CA PUCCH transmission scheme that is based on the PUCCH format 3, where only one slot is shown. As illustrated in FIG. 10, the multiple HARQ ACK/NACK bits are encoded to form 48 coded bits. The coded bits are then scrambled with cell-specific (and possibly DFTS-OFDM symbol dependent) sequences. Twenty-four (24) bits are transmitted within the first slot and the other 24 bits are transmitted within the second slot. The 24 bits per slot are converted into 12 QPSK symbols, DFT precoded, spread across five DFTS-OFDM symbols and transmitted within one resource block (bandwidth) and five DFTS-OFDM symbols (time). The spreading sequence (OC) is terminal specific and enables multiplexing of up to five users within the same resource blocks. For the reference signals, cyclic shifted Constant Amplitude Zero AutoCorrelation (CAZAC) sequences can be used. Some examples of CAZAC sequences that can be used are the computer optimized sequences in disclosed in 3GPP Technical Specification (TS) 36.211, "Physical Channels and Modulation."

The second CA PUCCH transmission scheme is referred to as channel selection. The basic principle is that the terminal is assigned a set of PUCCH format 1a/1b resources. The terminal then selects one of resources according to the HARQ ACK/NACK sequence that the terminal should transmit. The terminal then transmits a QPSK or BPSK on the selected resource. The base station detects which resource the terminal uses and which QPSK or BPSK value the terminal fed back on the used resource and combines this into a HARQ acknowledgement for associated downlink CCs. The mapping of ACK (A), NACK (N) and DTX (D) is according to FIG. 11A, FIG. 11B and FIG. 11C for Frequency Division Duplexing (FDD). A similar type of mapping including a bundling approach is also done for Time Division Duplexing (TDD) in case the terminal is configured with channel selection.

The discussion above describes PUCCH for conventional LTE deployments. However, as new deployments (e.g., heterogeneous cellular communications networks) emerge, there is a need for PUCCH transmission schemes for these new deployments.

SUMMARY

Systems and methods for transmitting uplink control signals in a cellular communications network are disclosed. In one embodiment, a wireless device configured to operate in a cellular communications network includes a radio subsystem and a processing subsystem. The processing subsystem selects a value for at least one parameter for an uplink control channel format based on content to be transmitted in an uplink control channel transmission according to the uplink control channel format. The processing subsystem then transmits, via the radio subsystem, the content in an uplink control channel transmission according to the uplink control channel format and the value for the at least one parameter for the uplink control channel format selected based on the content.

In one embodiment, the wireless device is configured to operate in a decoupled uplink and downlink mode of operation. In this embodiment, the processing subsystem determines whether the content is targeted to an uplink reception node serving the wireless device or to a downlink transmission node serving the wireless device. The processing subsystem then selects a value for the at least one parameter, where the value is associated with transmissions targeting the uplink reception node for the wireless device if the content is targeted to the uplink reception node and the value is associated with transmissions targeting the downlink transmission node for the wireless device if the content is targeted to the downlink transmission node. If the content to be transmitted in the uplink control channel transmission is an uplink scheduling request, then the processing subsystem selects the value for the at least one parameter that targets the uplink reception node for the wireless device. If the content to be transmitted in the uplink control channel transmission is a Hybrid Automatic Repeat Request (HARQ) acknowledgement, then the processing subsystem selects the value for the at least one parameter that targets the downlink transmission node for the wireless device. If the content to be transmitted in the uplink control channel transmission is both an uplink scheduling request and a HARQ acknowledgement, then the processing subsystem selects the value for the at least one parameter that targets both the uplink reception node and the downlink transmission node for the wireless device.

In one particular embodiment, the cellular communications network is a Long Term Evolution (LTE) cellular communications network, and the uplink control channel format is a Physical Uplink Control Channel (PUCCH) format. In one embodiment, the at least one parameter is a power control parameter. In another embodiment, the at least one parameter includes one or more parameters from the group consisting of: a power control parameter, a base sequence, a cyclic shift, a cyclic shift hopping pattern, an orthogonal cover code, and a PUCCH resource block.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 13:
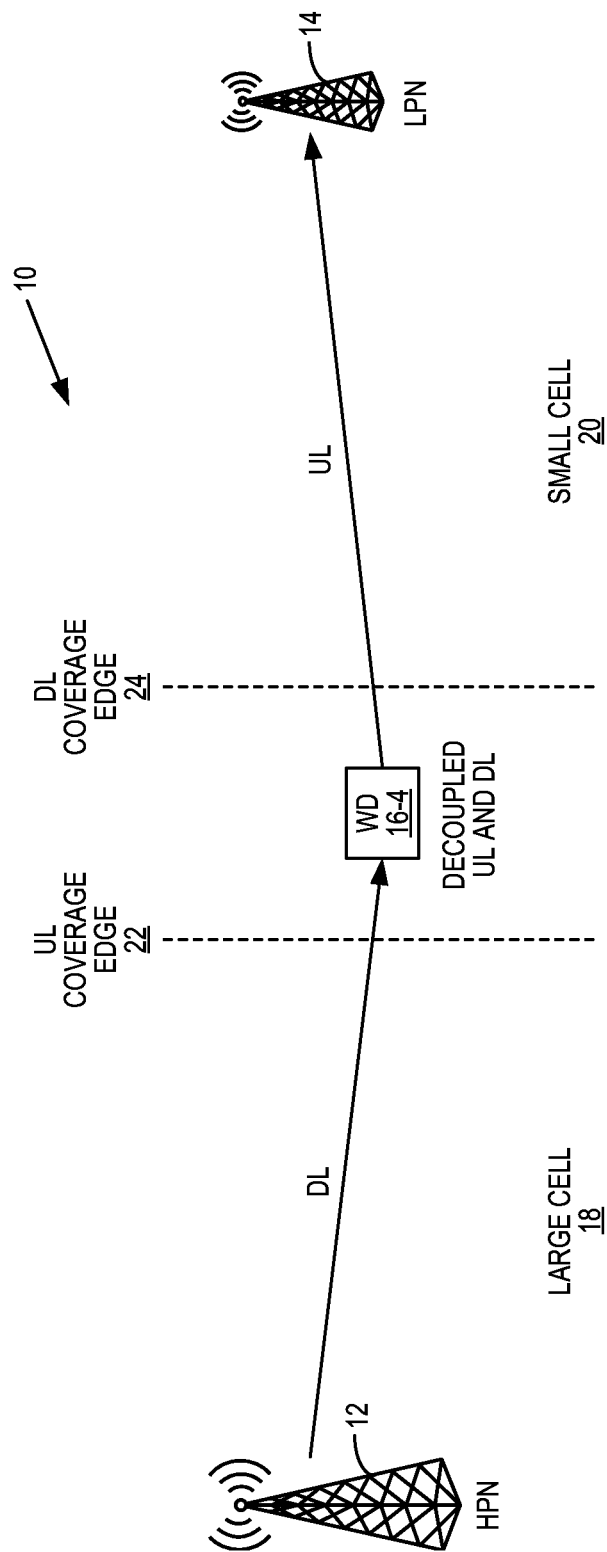
FIG. 13 illustrates a wireless device in the heterogeneous cellular communications network that is operating in a decoupled uplink and downlink mode of operation.
Figure 15:
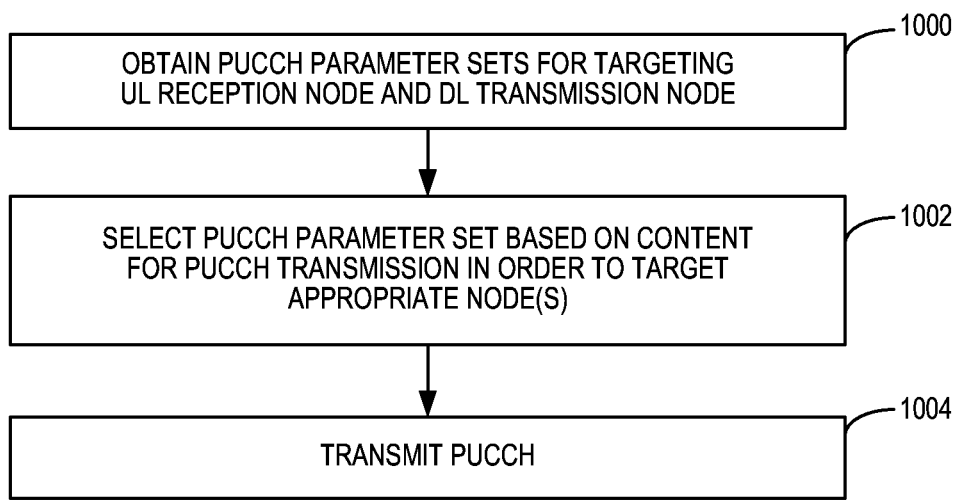
Figure 16:
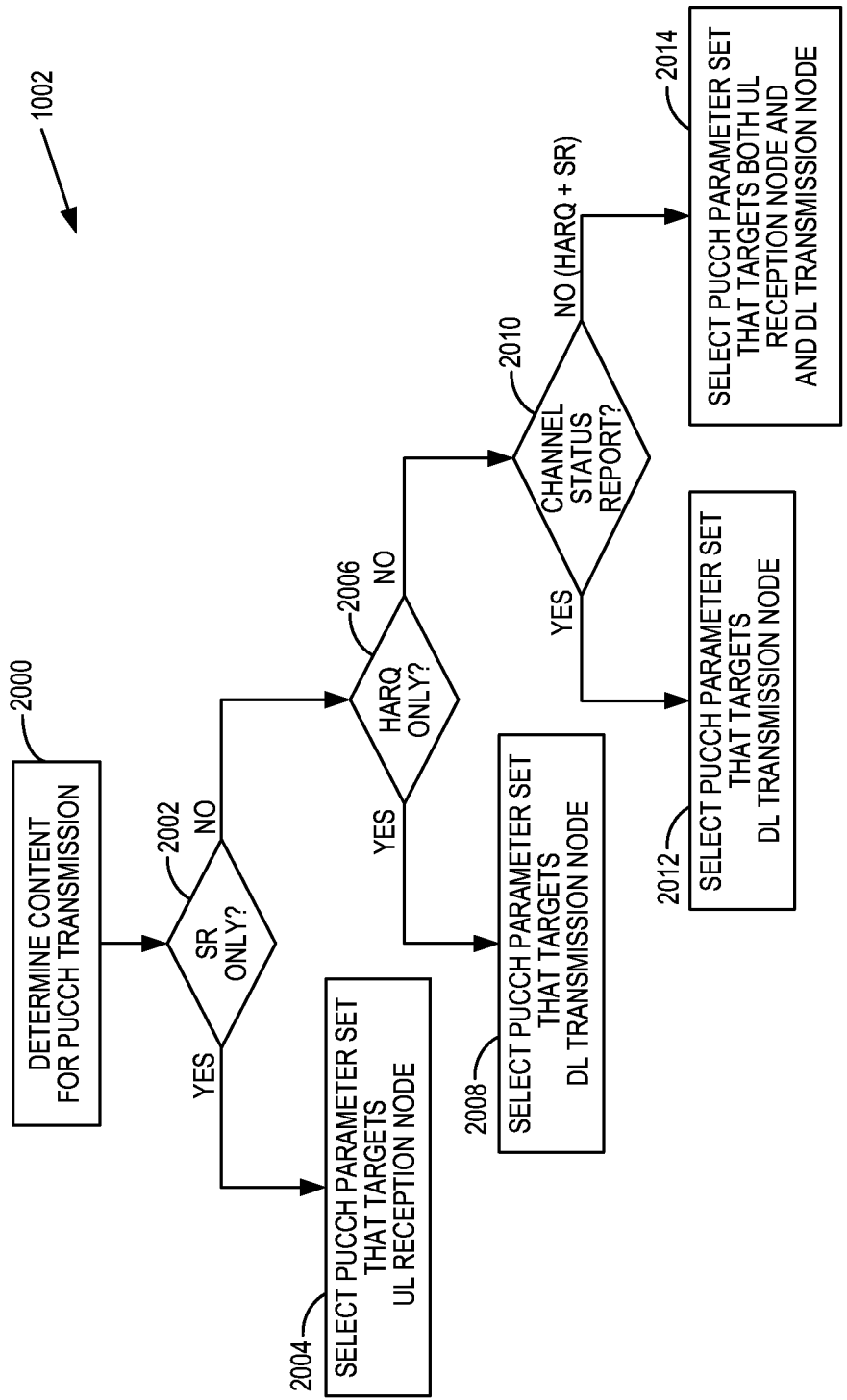
Figure 17:
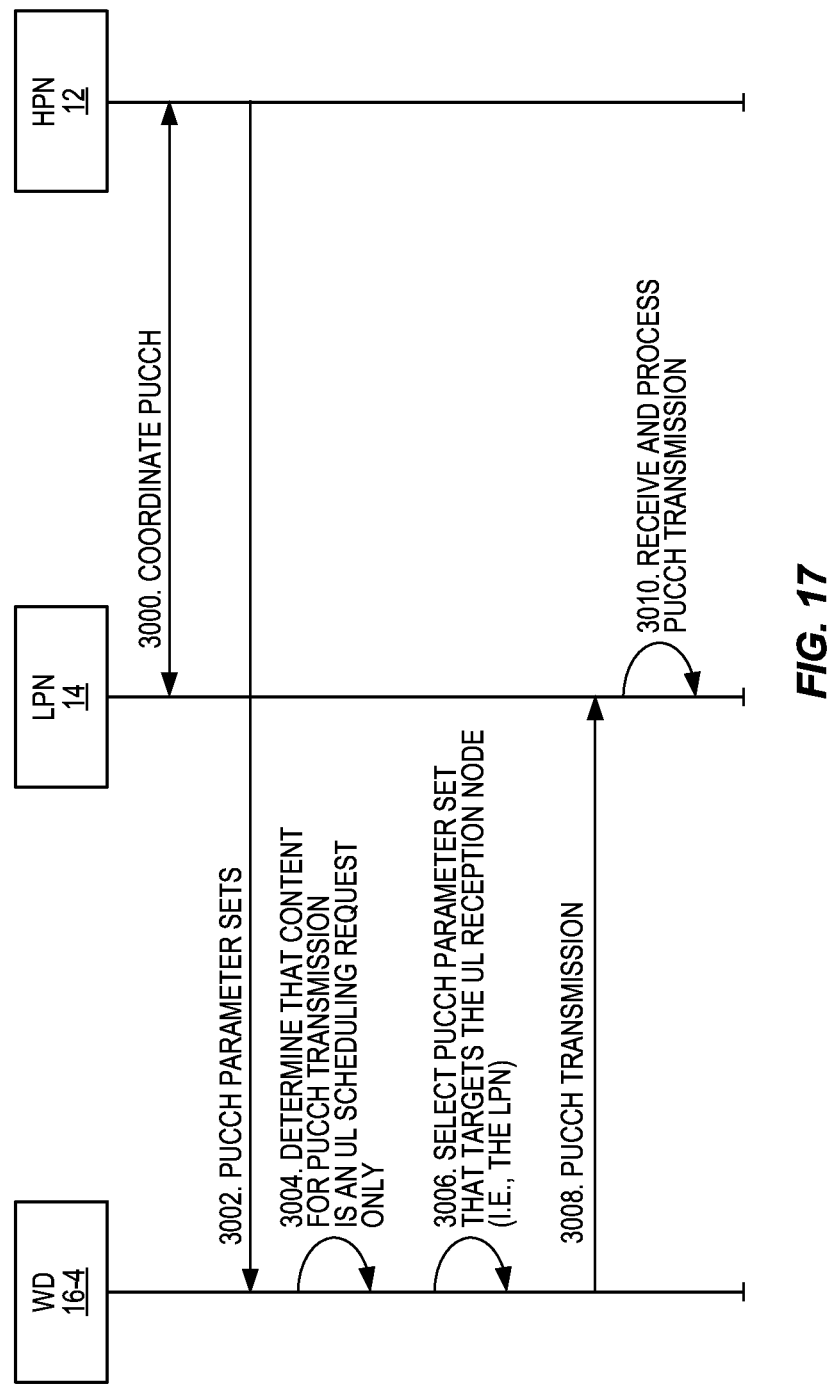
Figure 18:
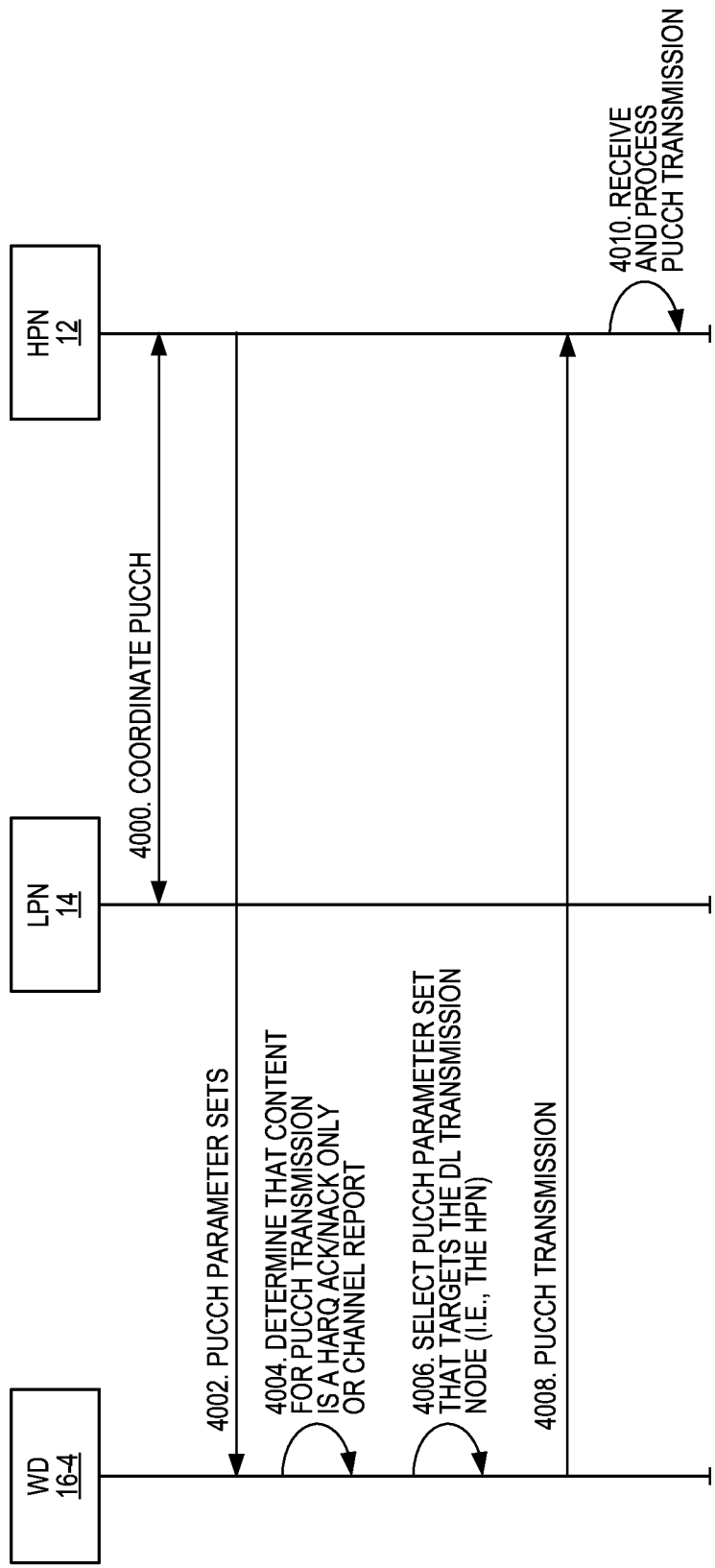
Figure 19:
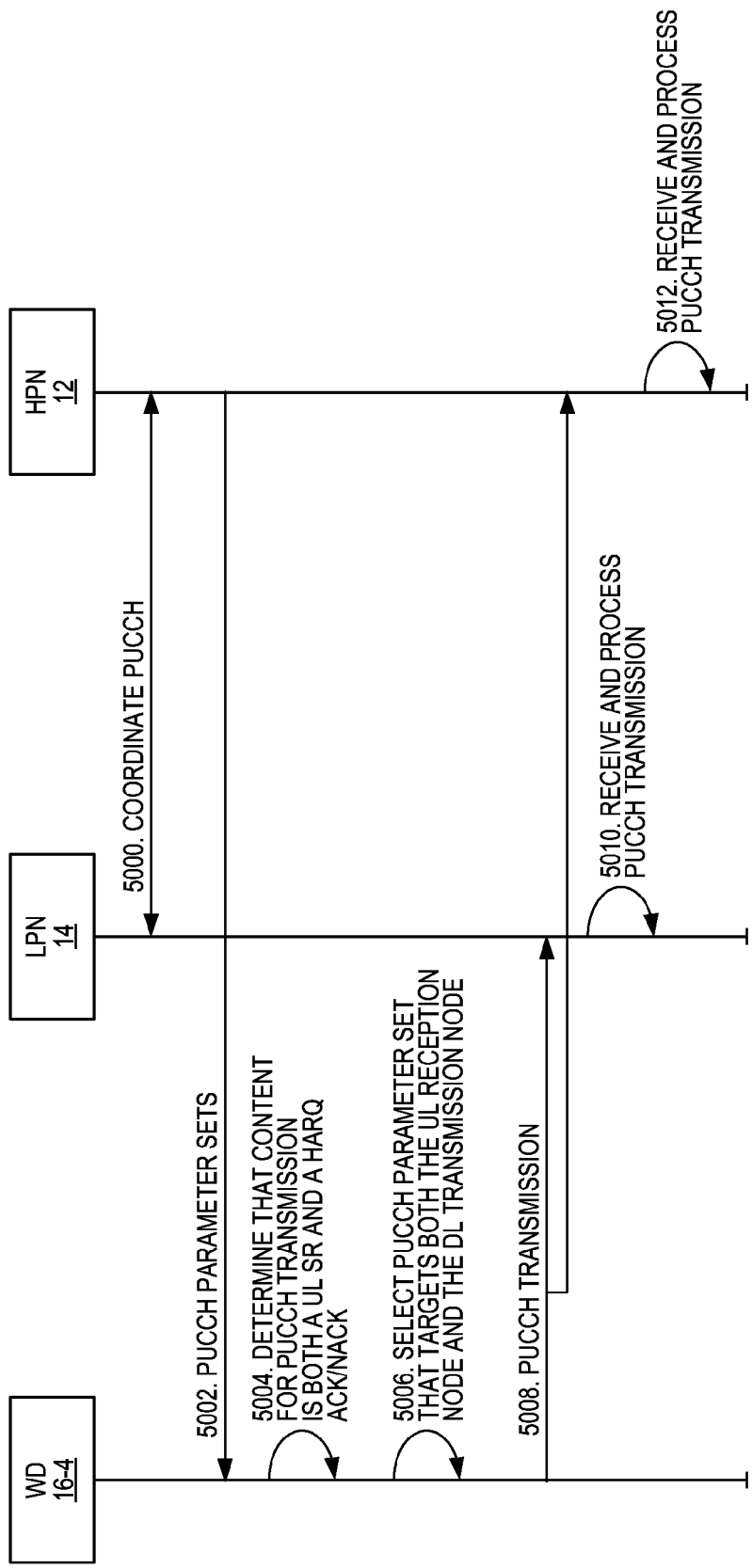
Figure 20A:
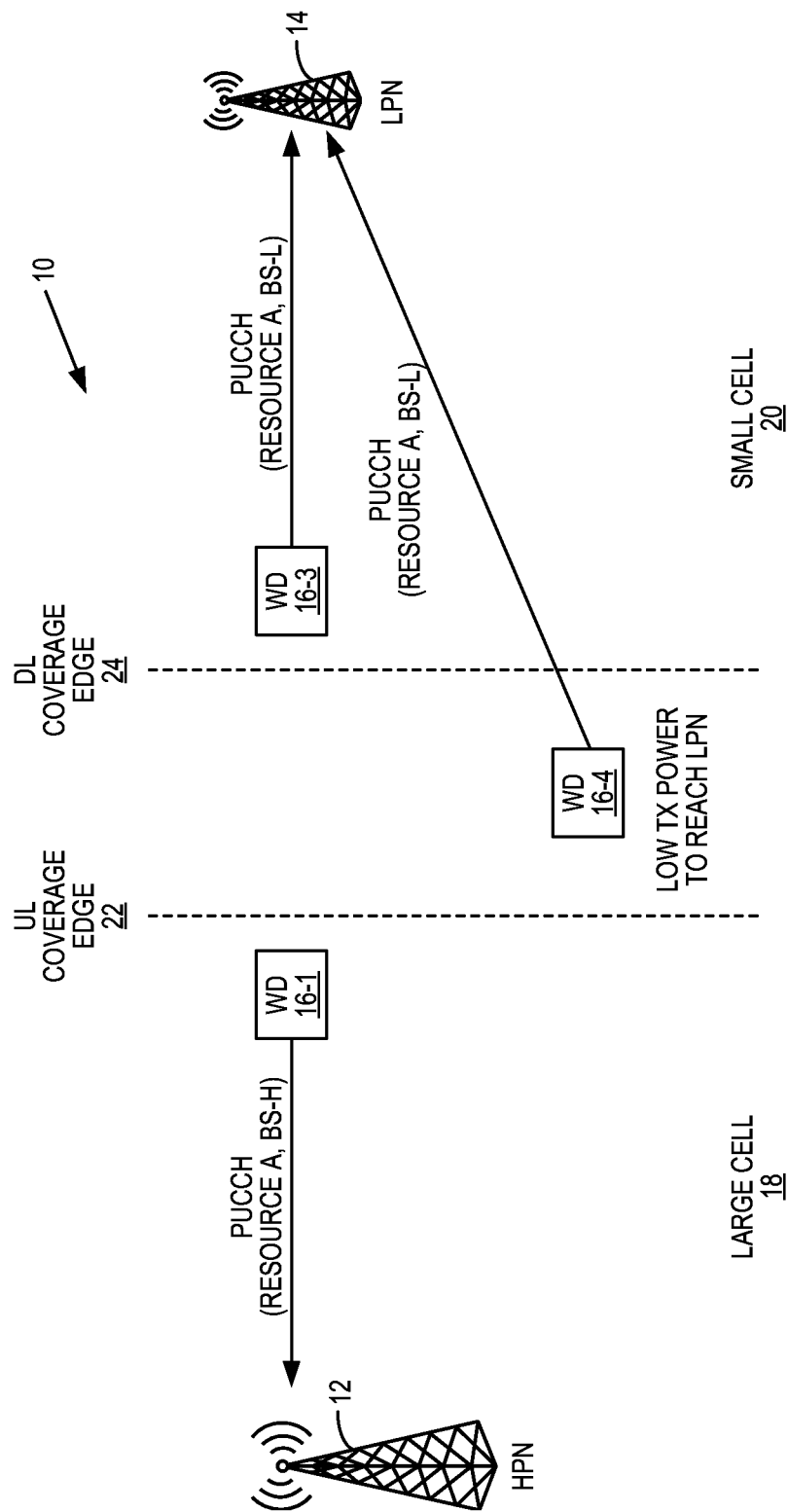
Figure 20B:
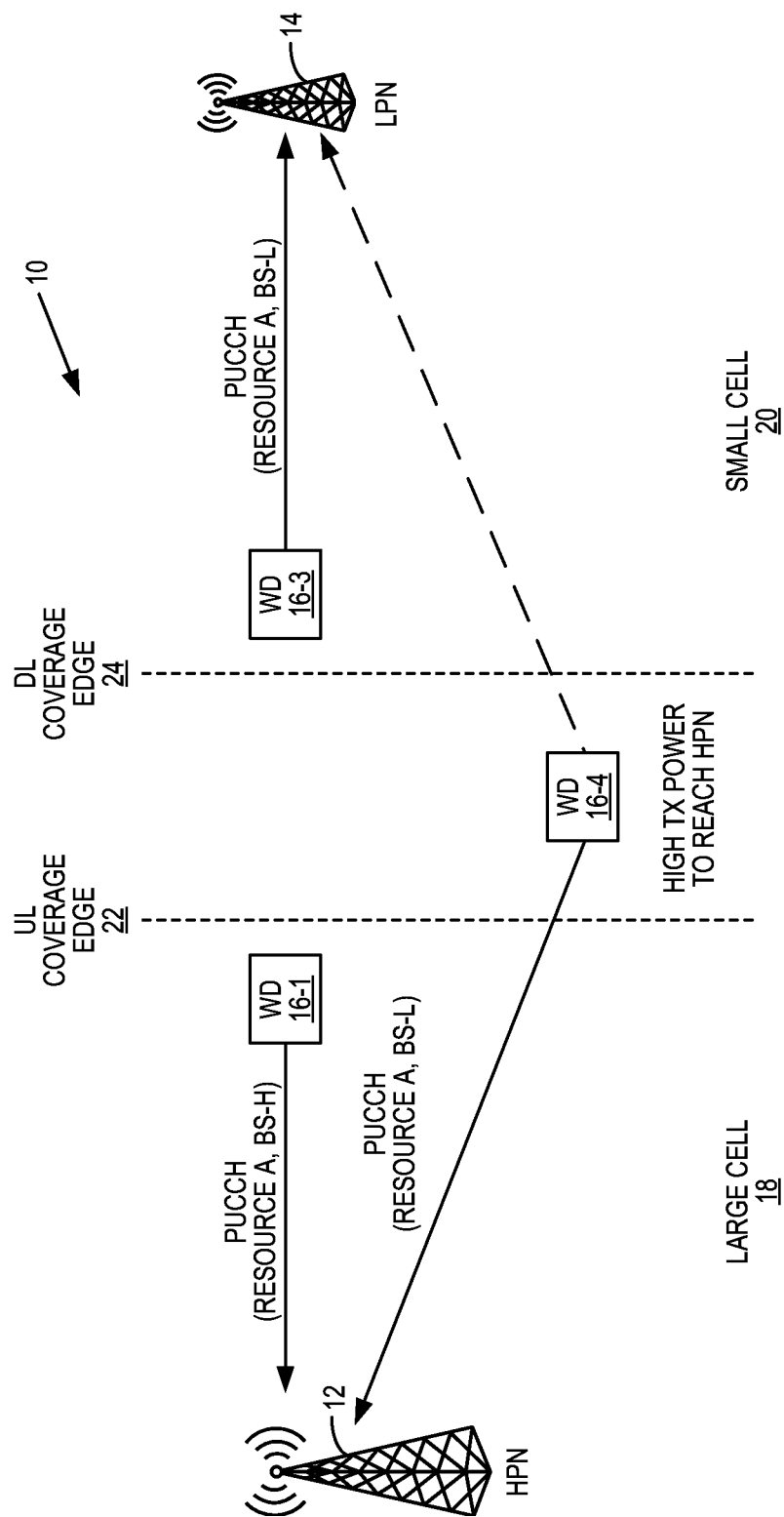
Figure 21A:
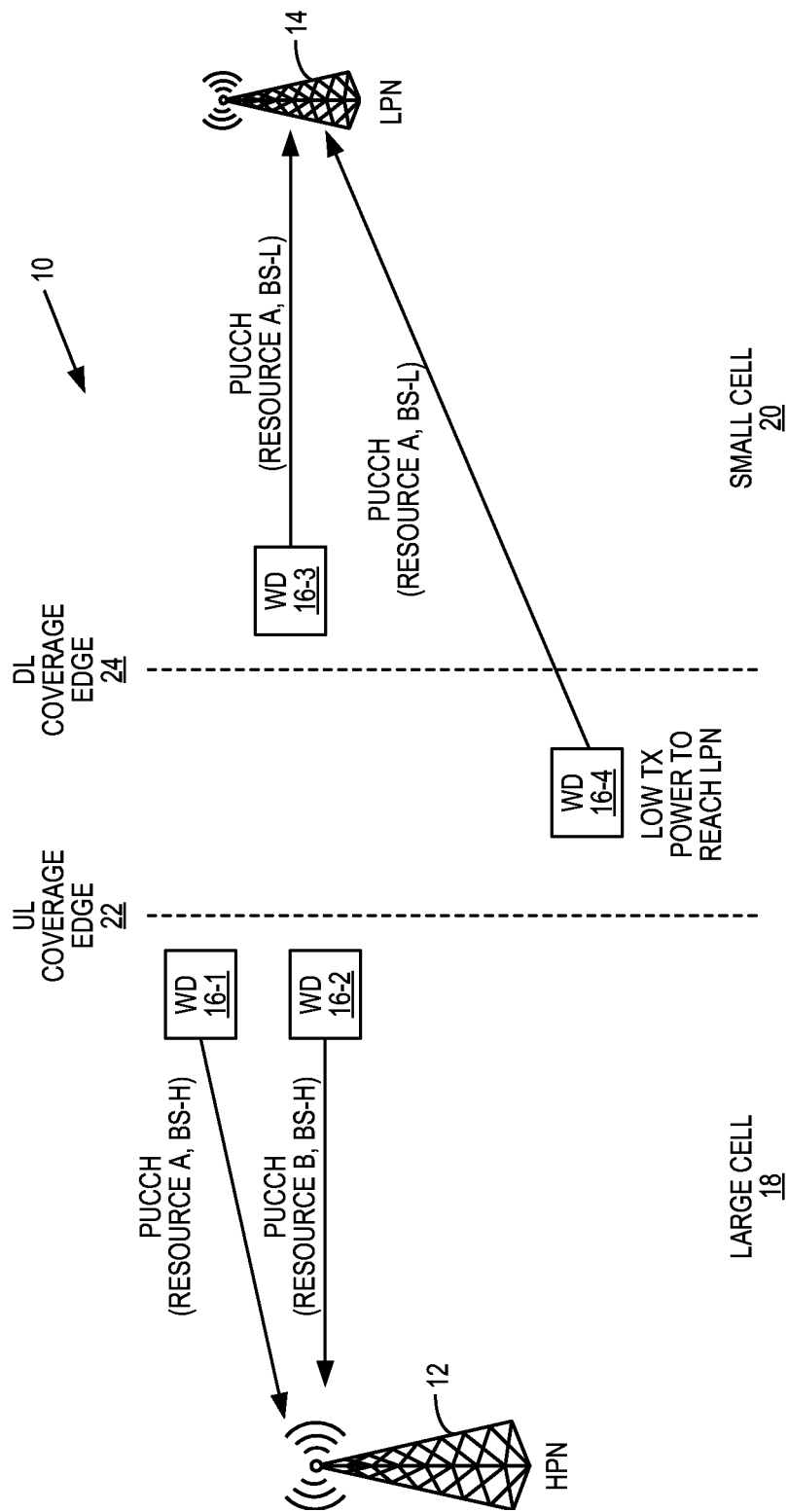
Figure 21B:
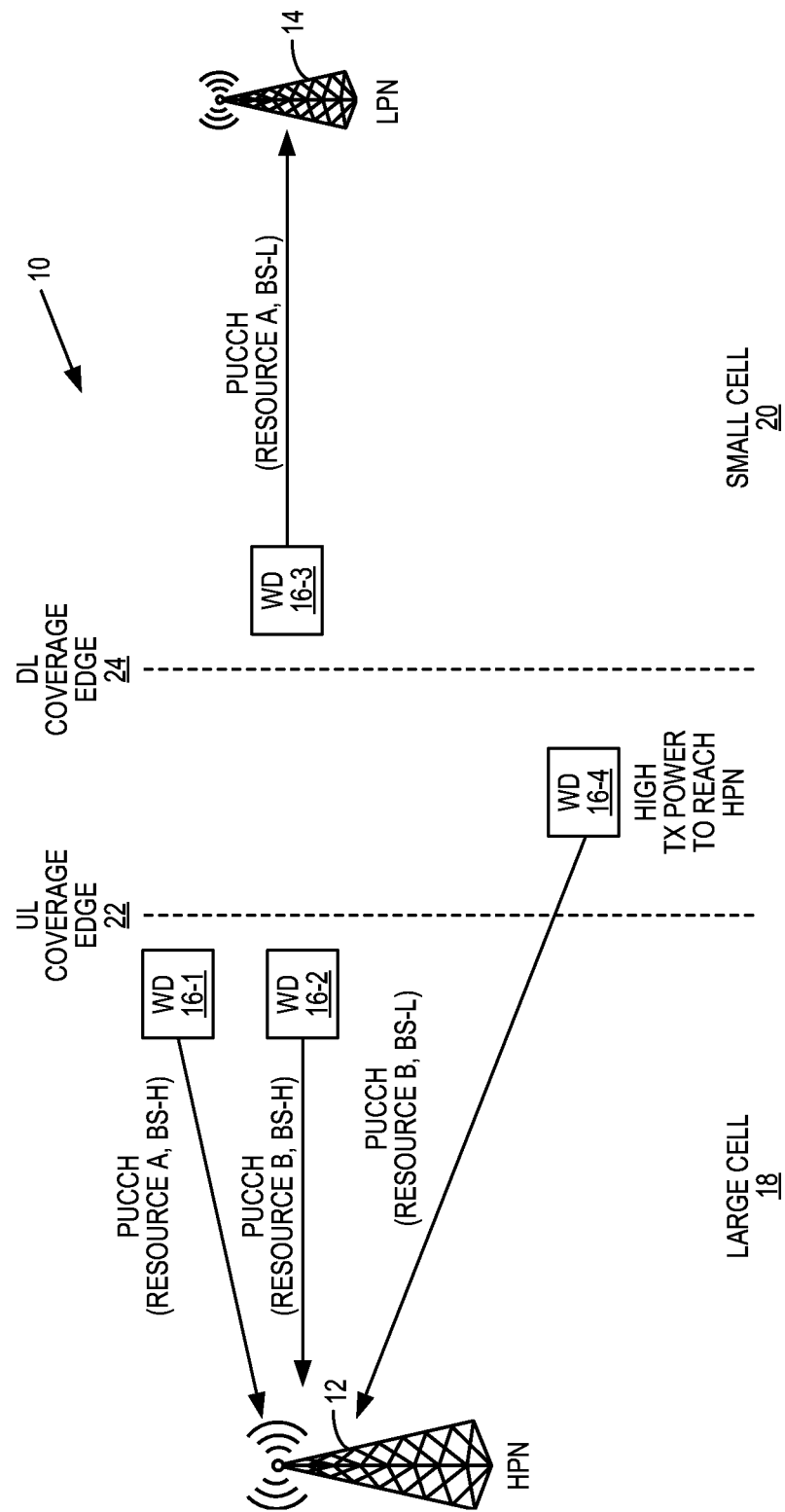
Figure 22:
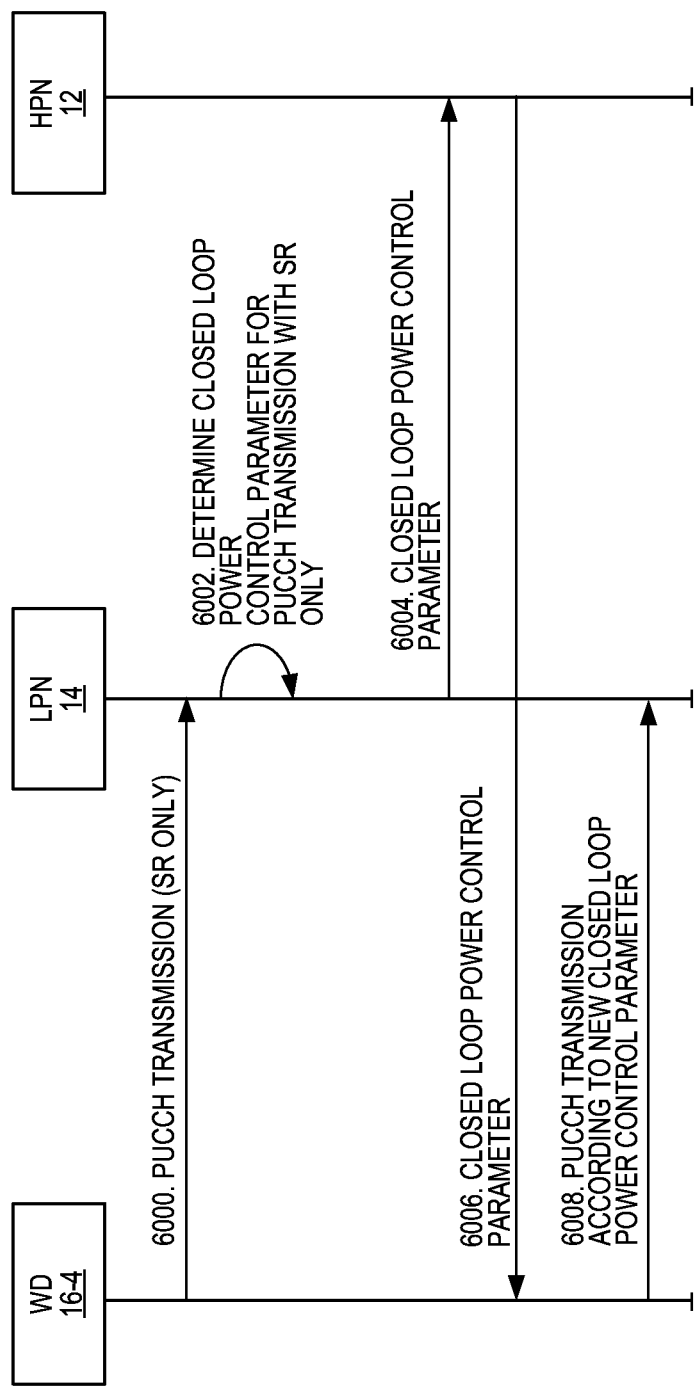
Figure 23:
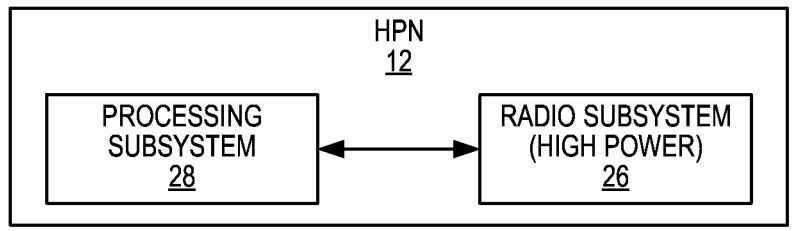
Figure 24:
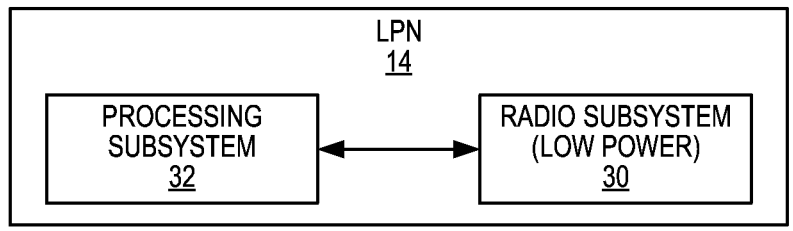

FIG. 15 is a flow chart that illustrates the operation of the wireless device of FIG. 13 to select one or more PUCCH parameter values for a PUCCH format based on the content to be transmitted in a PUCCH transmission in order to target the uplink reception node, the downlink transmission node, or both the uplink reception node and the downlink transmission node for the wireless device when operating in the decoupled uplink and downlink mode of operation according to one embodiment of the present disclosure;

FIG. 16 is a more detailed flow chart that illustrates a process for selecting the one or more PUCCH parameter values in the process of FIG. 15 according to one embodiment of the present disclosure;

FIG. 17 illustrates the operation of the wireless device, the low power node, and the high power node of FIG. 13 in an example where the content to be transmitted in the PUCCH transmission is an uplink scheduling request according to one embodiment of the present disclosure;

FIG. 18 illustrates the operation of the wireless device, the low power node, and the high power node of FIG. 13 in an example where the content to be transmitted in the PUCCH transmission is a HARQ ACK/NACK according to one embodiment of the present disclosure;

FIG. 19 illustrates the operation of the wireless device, the low power node, and the high power node of FIG. 13 in an example where the content to be transmitted in the PUCCH transmission is both an uplink scheduling request and a HARQ ACK/NACK according to one embodiment of the present disclosure;

FIGS. 20A and 20B illustrate one example of the selection of the PUCCH parameters to target either the downlink transmission node (i.e., the High Power Node (HPN)) or the uplink reception node (i.e., the Low Power Node (LPN)) and also enable multiplexing of the PUCCH transmission from the wireless device with PUCCH transmissions from other wireless device(s) on the same PUCCH resource according to one embodiment of the present disclosure;

FIGS. 21A and 21B illustrate one example of the selection of the PUCCH parameters to target either the downlink transmission node (i.e., the HPN) or the uplink reception node (i.e., the LPN) and also enable multiplexing of the PUCCH transmission from the wireless device with PUCCH transmissions from other wireless device(s) according to another embodiment of the present disclosure;

FIG. 22 illustrates a closed loop power control scheme for PUCCH transmissions that contain only uplink scheduling requests according to one embodiment of the present disclosure;

FIG. 23 is a block diagram of one embodiment of the HPN;

FIG. 24 is a block diagram of one embodiment of the LPN; and

Figure 25:
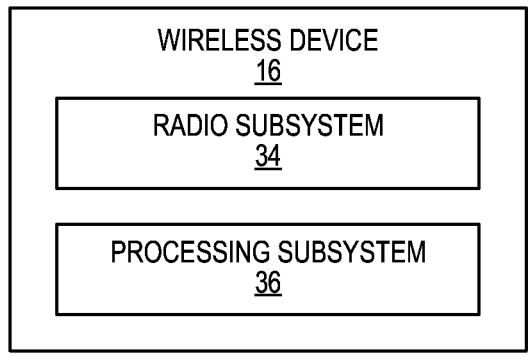

FIG. 25 is a block diagram of one embodiment of the wireless device.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for transmitting uplink control signals in a cellular communications network are disclosed. In the preferred embodiments disclosed below, systems and methods for transmitting uplink control signals are disclosed for a deployment of a cellular communications network in which a wireless device operates in a decoupled uplink (UL) and downlink (DL) mode of operation. This deployment is preferably a heterogeneous deployment of a cellular communications network, but is not limited thereto. Before discussing the transmission schemes for the uplink control signals, a brief discussion of a heterogeneous deployment of a cellular communications network as well as a decoupled UL and DL mode of operation is beneficial.

Figure 1:
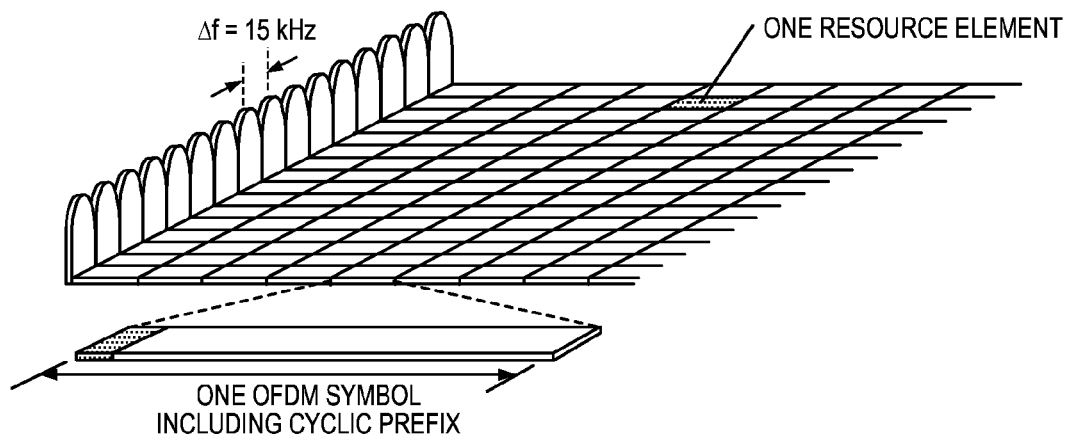
FIG. 1 illustrates a conventional $3^{rd}$ Generation Partnership Project (3GPP) Long Term Evolution (LTE) downlink physical resource.
Figure 2:
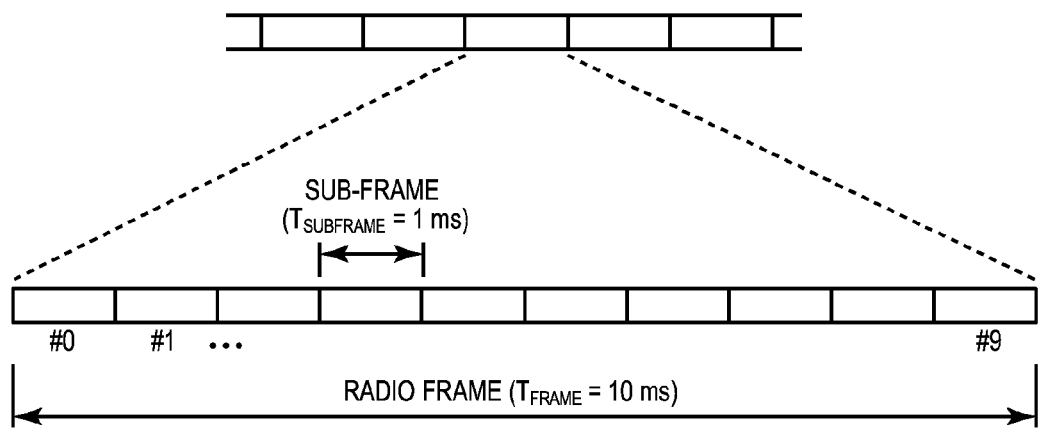
FIG. 2 illustrates a conventional 3GPP LTE frame structure in the time domain.
Figure 3:
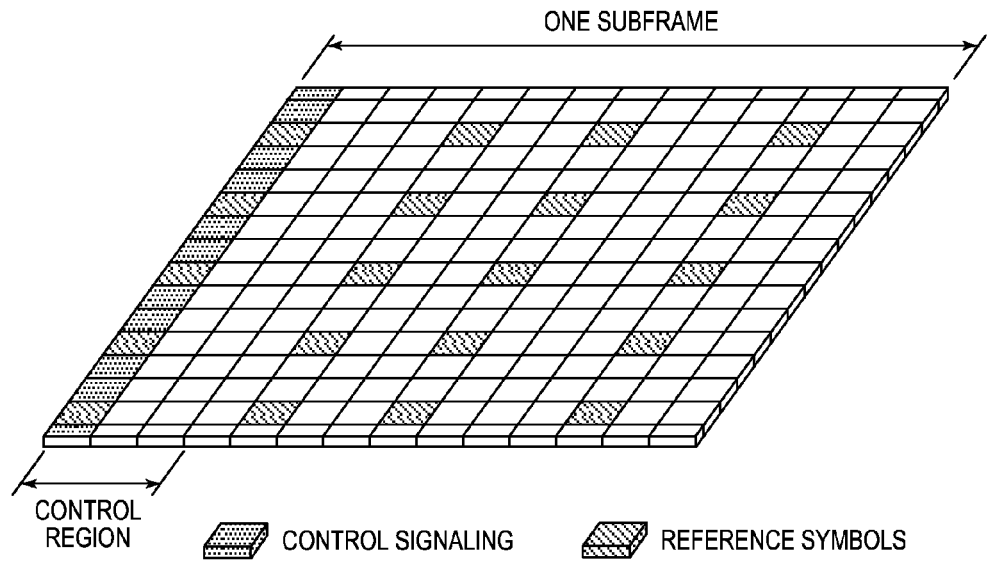
FIG. 3 illustrates a conventional 3GPP LTE downlink subframe.
Figure 4:
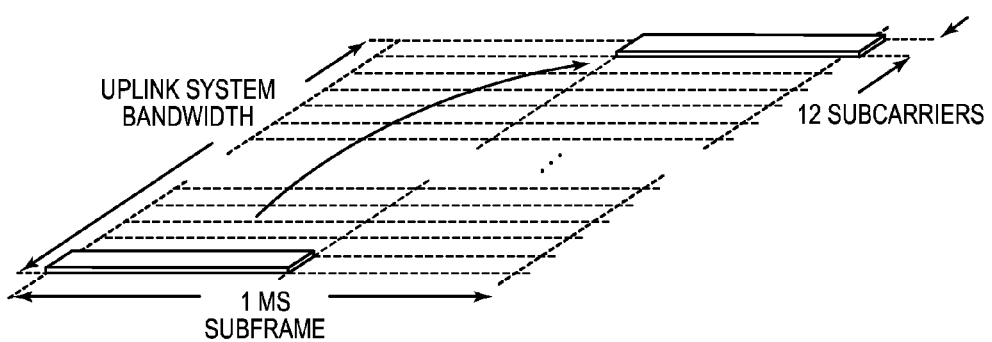
FIG. 4 illustrates a conventional uplink L1/L2 control signaling transmission on the 3GPP LTE Public Uplink Control Channel (PUCCH)
Figure 5:
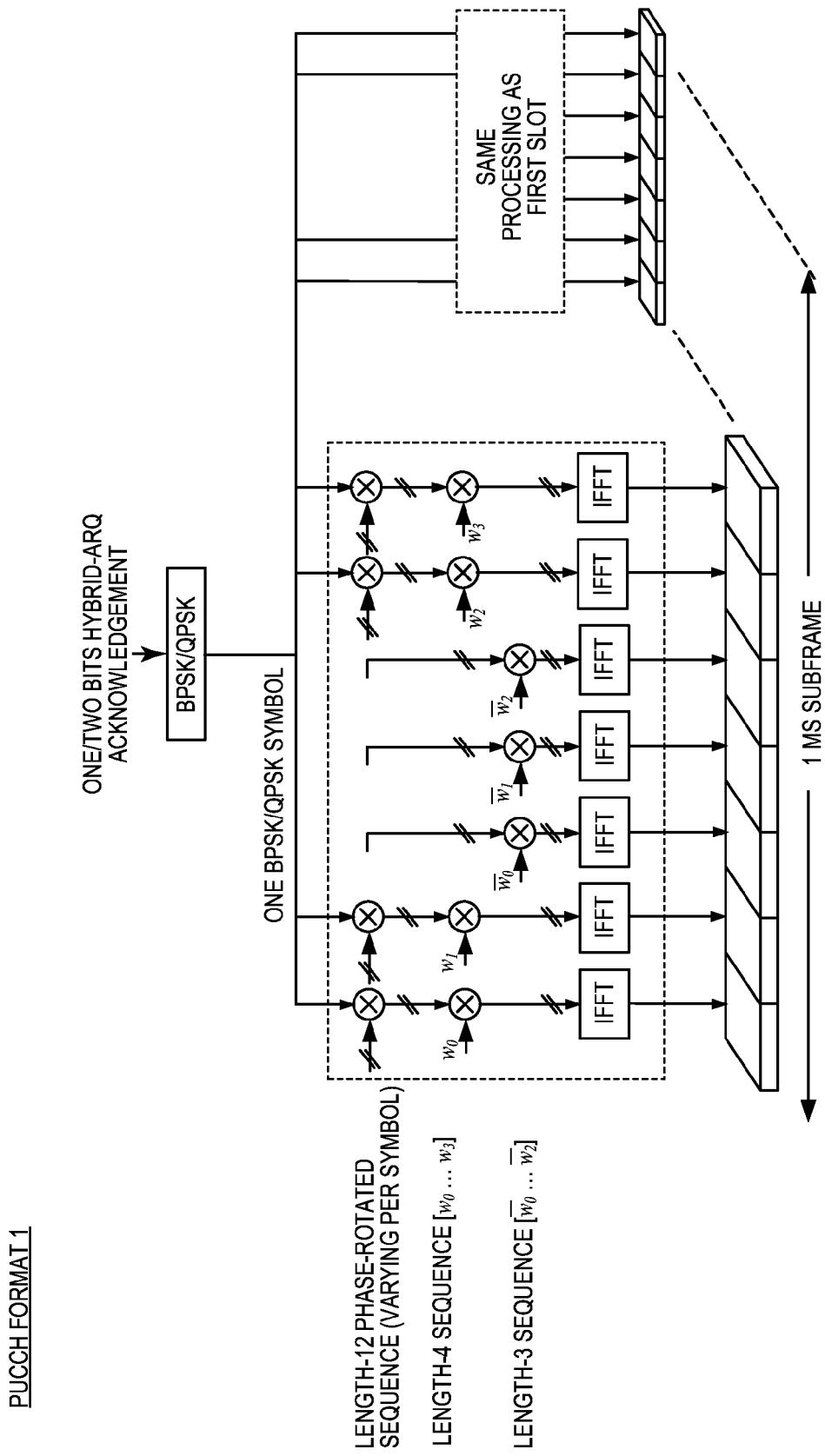
FIG. 5 illustrates a conventional PUCCH format 1 utilized to transmit a Hybrid Automatic Repeat Request (HARQ) Acknowledgement (ACK) or Non-Acknowledgement (NACK) and/or an uplink scheduling request on the 3GPP LTE PUCCH.
Figure 6:
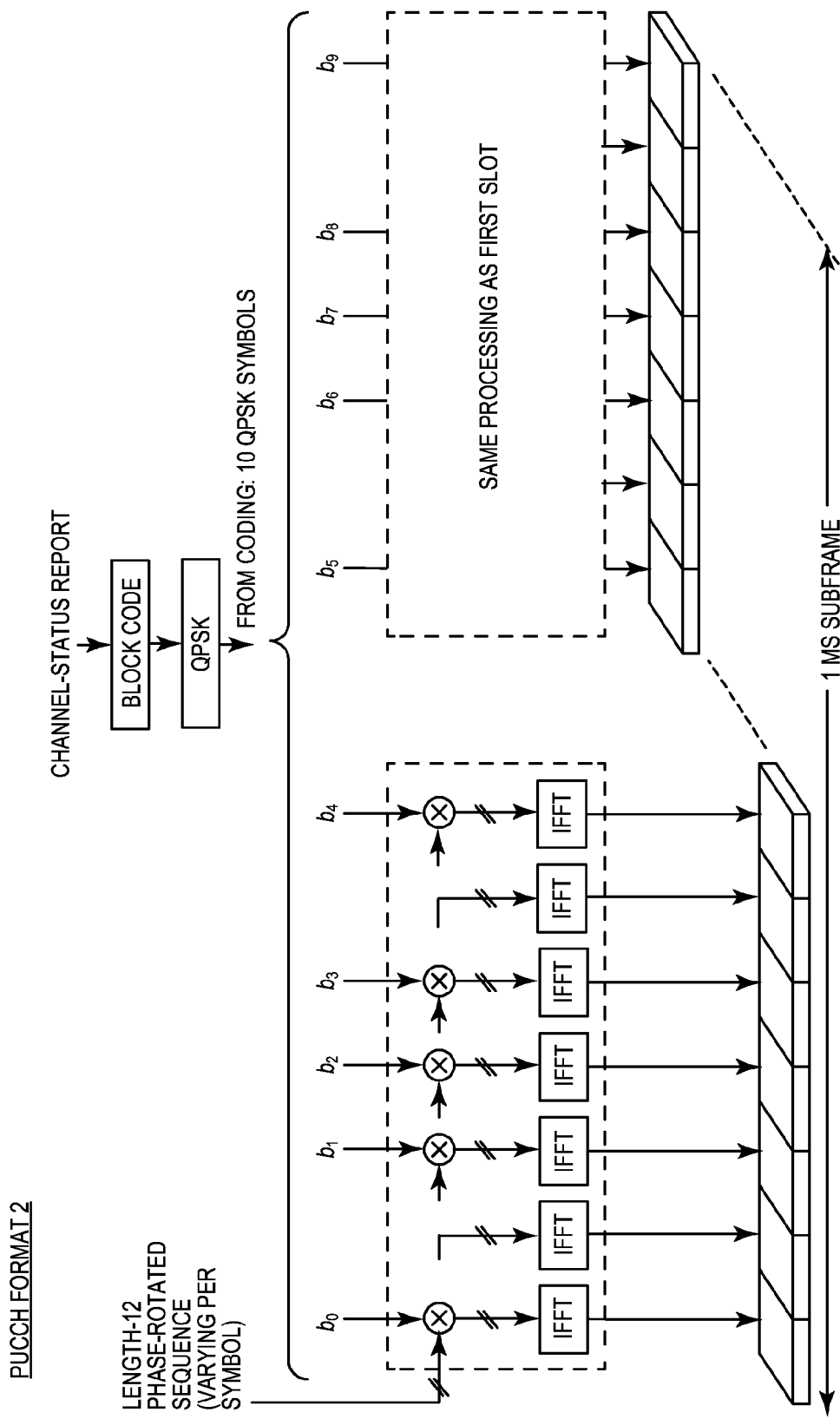
FIG. 6 illustrates a conventional PUCCH format 2 utilized to transmit a channel state report on the 3GPP LTE PUCCH.
Figure 7:
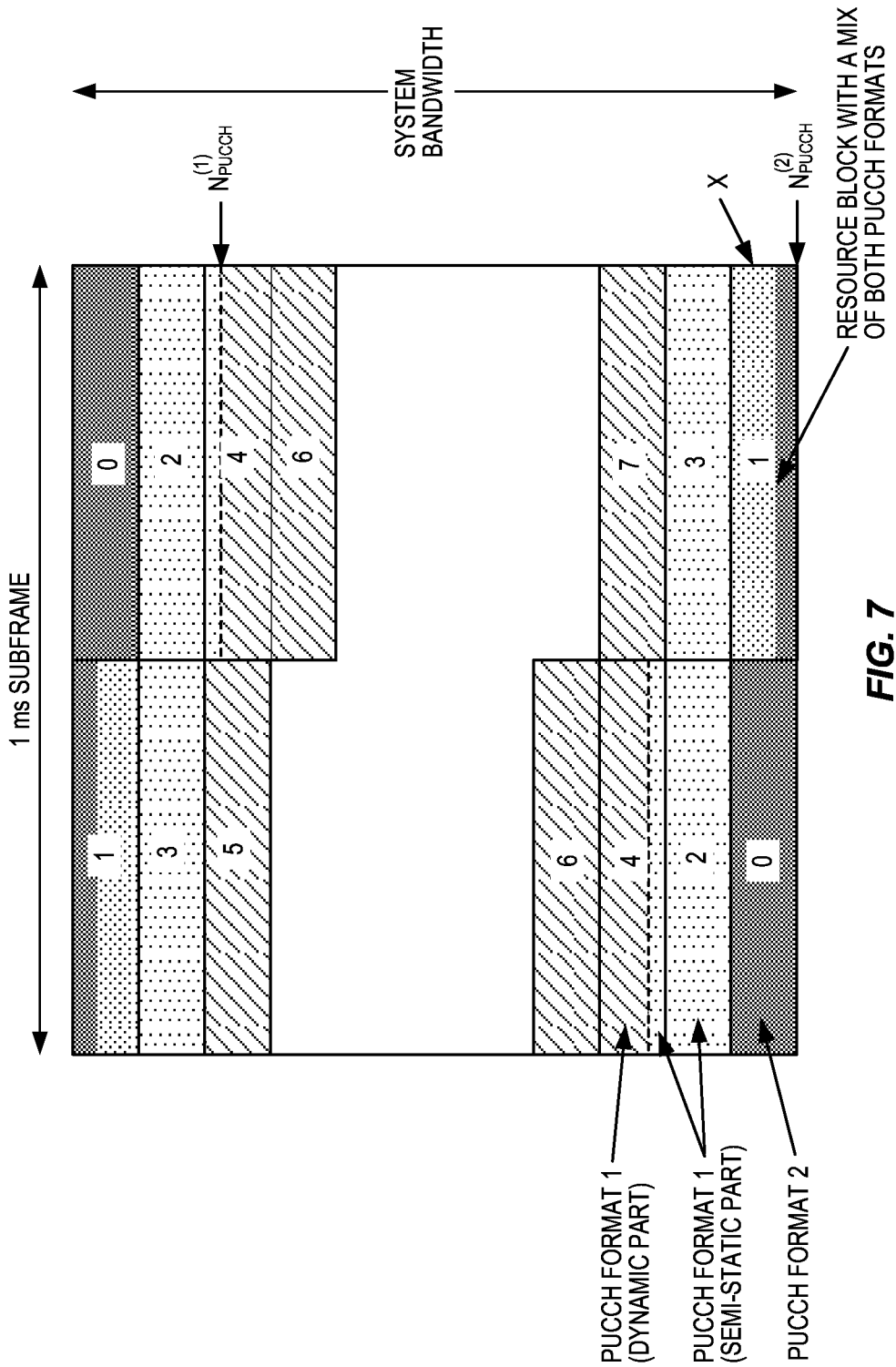
FIG. 7 illustrates a conventional allocation of resource blocks on the 3GPP LTE PUCCH.
Figure 8:
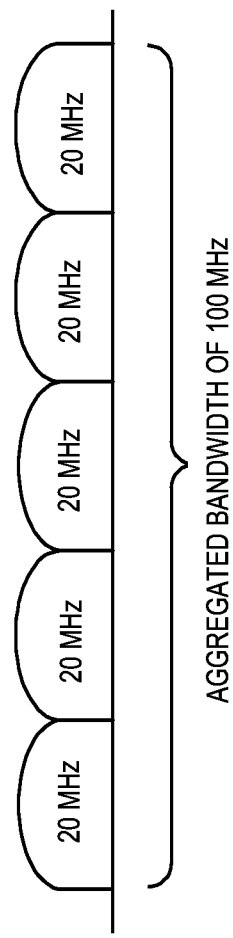
FIG. 8 illustrates a number of Component Carriers (CCs) aggregated according to a conventional 3GPP LTE Carrier Aggregation (CA) scheme.
Figure 9:
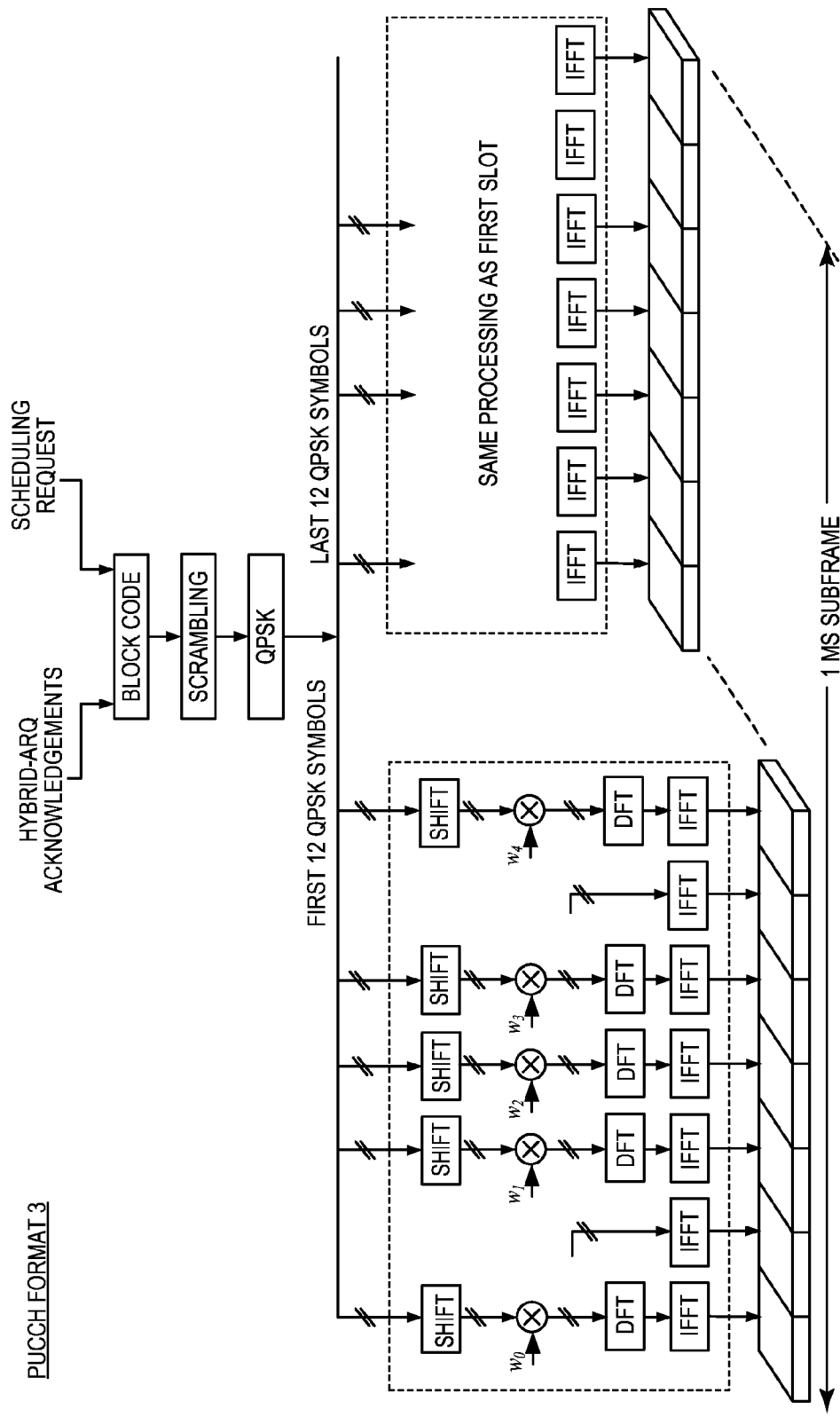
FIG. 9 illustrates a PUCCH format 3 that can be utilized to transmit a HARQ ACK/NACK and/or an uplink scheduling request for multiple CCs.
Figure 10:
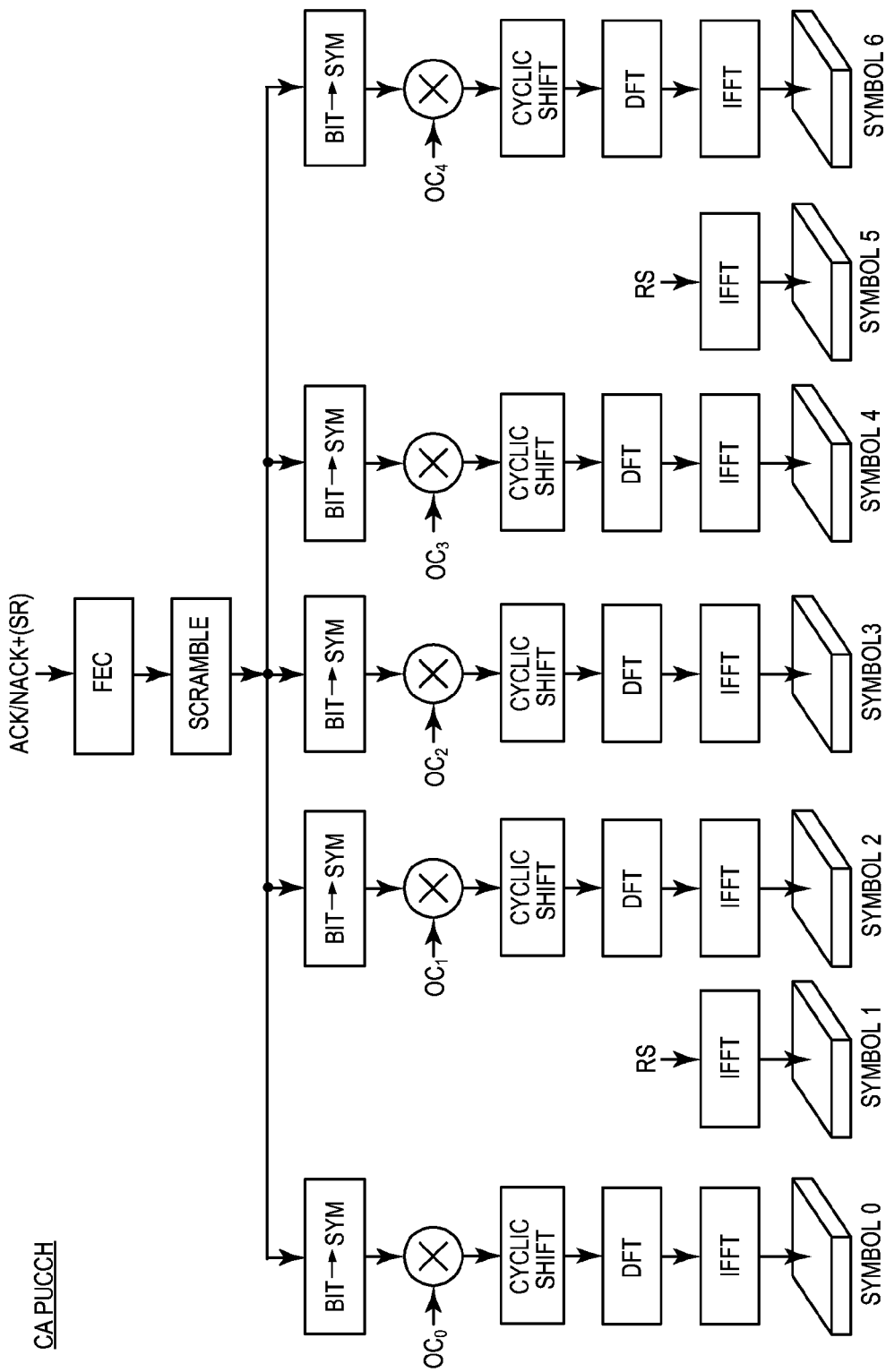
FIG. 10 illustrates one example of a CA PUCCH format that can be utilized to transmit HARQ ACK/NACKs and/or uplink scheduling requests for multiple CCs.
Figure 11A:
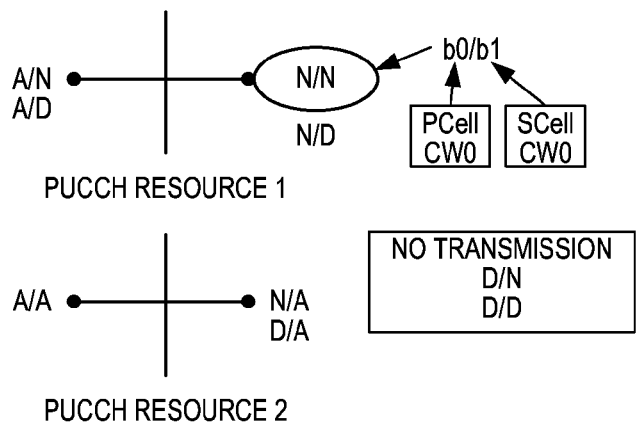
FIGS. 11A through 11C illustrate a channel selection scheme for utilizing PUCCH format 1 resources to transmit HARQ ACK/NACKs and uplink scheduling requests for multiple CCs.
Figure 11B:
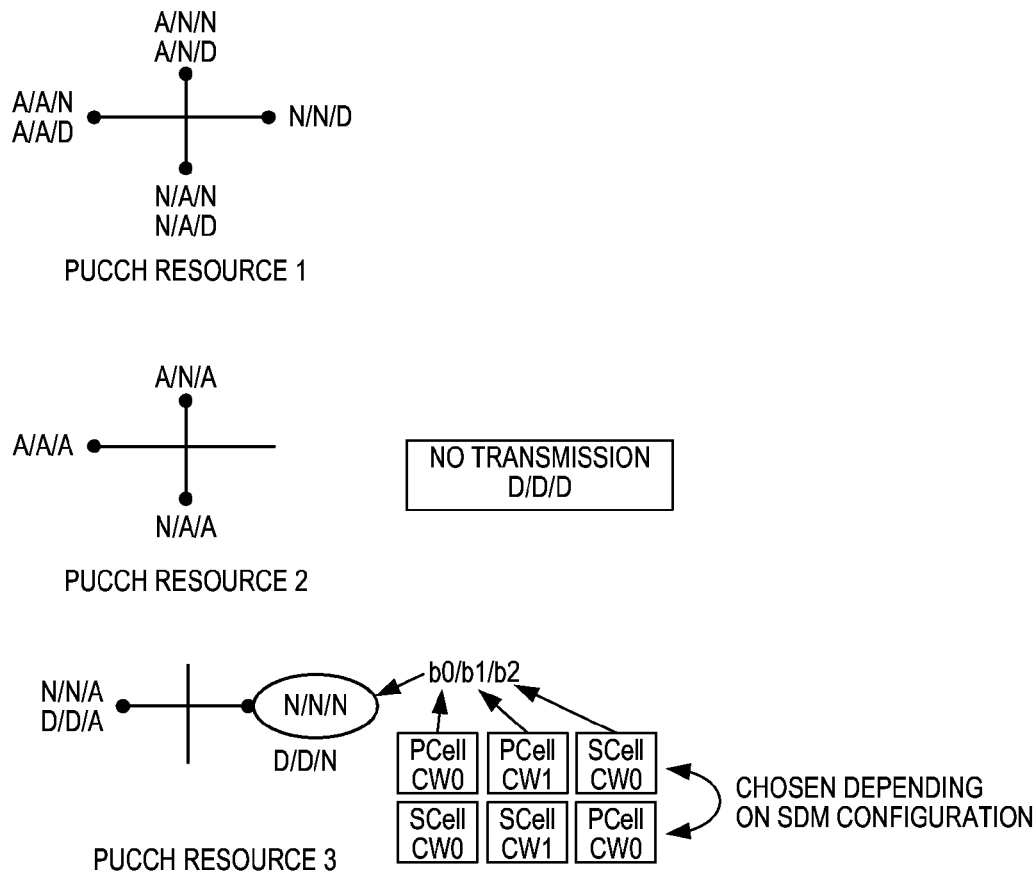
Figure 11C:
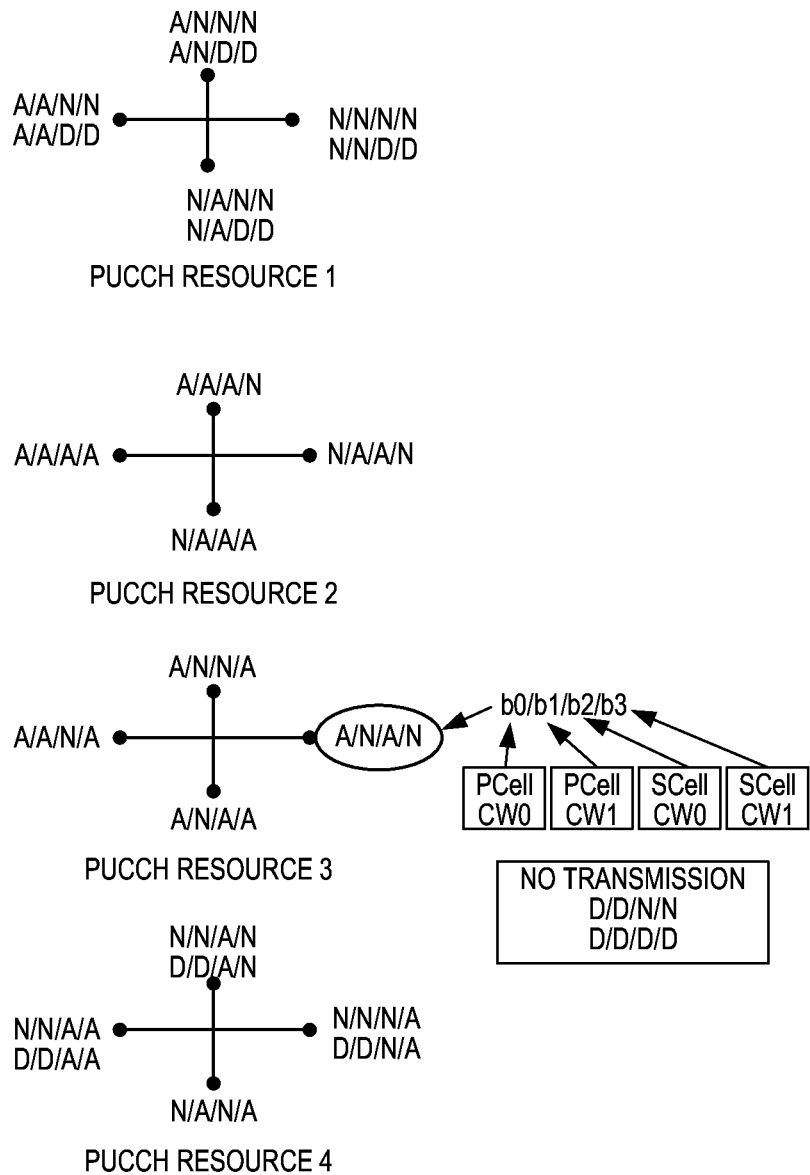
Figure 12:
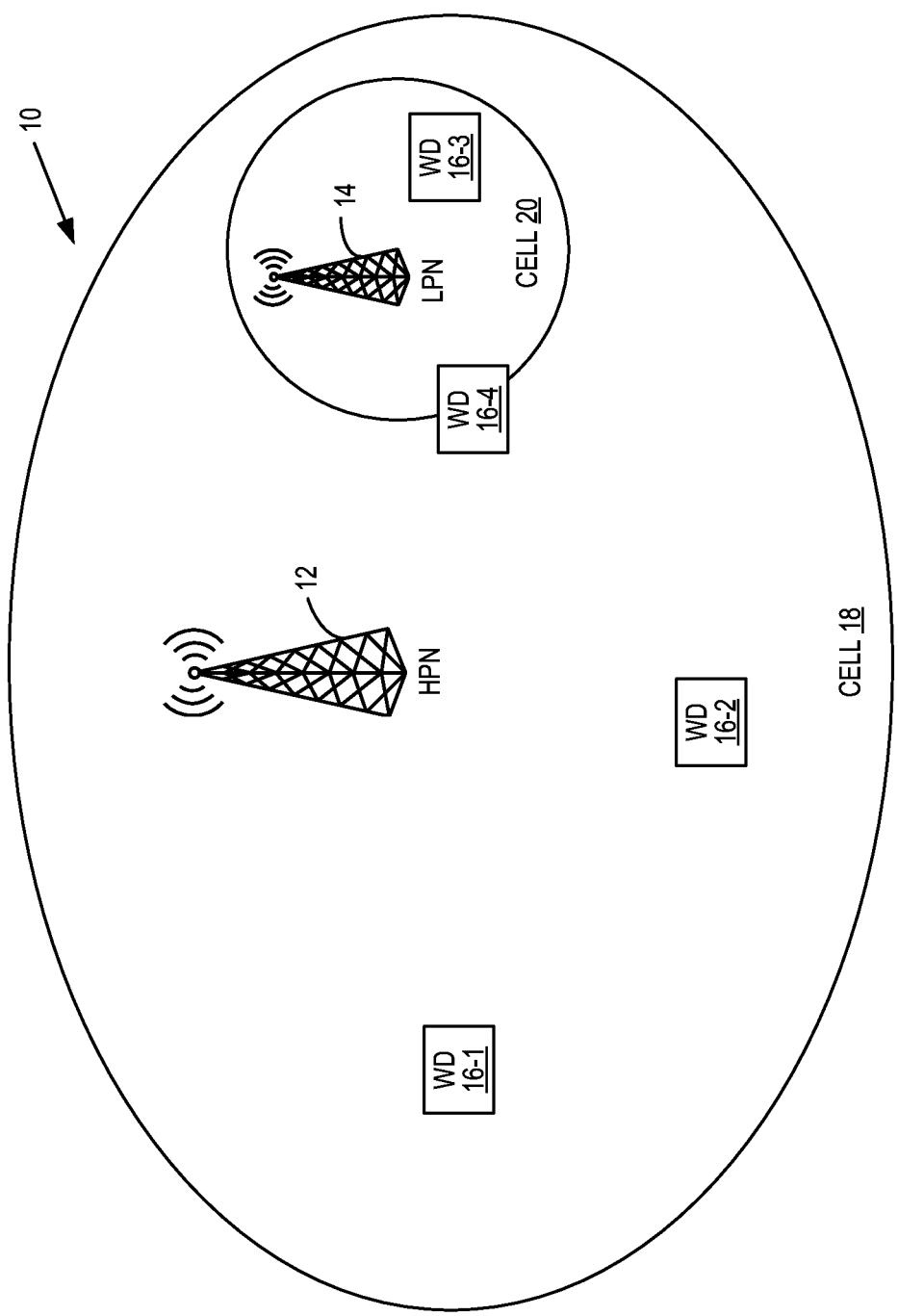
FIG. 12 illustrates a heterogeneous cellular communications network.

In this regard, FIG. 12 illustrates one example of a heterogeneous deployment of a cellular communications network, which is referred to herein as a heterogeneous network 10. As illustrated, the heterogeneous network 10 includes a High Power Node (HPN) 12, or high power base station, and a Low Power Node (LPN) 14, or low power base station. The LPN 14 generally transmits at significantly lower power levels than the HPN 12. For example, the maximum transmit power level of the LPN 14 may be up to 16 decibels (dB) less than the maximum transmit power level of the HPN 12. As a note, LPNs, such as the LPN 14, have emerged to, for example, meet increasing capacity demands particularly in high density areas. The HPN 12 serves wireless devices (WDs), such as wireless devices 16-1 and 16-2, located in a corresponding large cell 18 in the heterogeneous network 10. Likewise, the LPN 14 serves wireless devices, such as wireless device16-3, located in a corresponding small cell 20 in the heterogeneous network 10. A wireless device 16-4 is located at a boundary between the large cell 18 and the small cell 20.

The heterogeneous network 10 is preferably a $3^{rd}$ Generation Partnership Project (3GPP) Long Term Evolution (LTE) network. As such, throughout this disclosure, 3GPP LTE terminology is often used. However, the concepts disclosed herein are not limited to 3GPP LTE. Rather, the concepts disclosed herein can be used in any suitable type of cellular communications network in which targeting of uplink control transmissions to an appropriate node in the network is desired. Further, for 3GPP LTE, the HPN 12 is a macro eNodeB (eNB) whereas the LPN 14 is a micro or pico eNB or similar low power base station.

FIG. 13 illustrates one example of a decoupled mode of operation for the wireless device 16-4 in the heterogeneous network 10 of FIG. 12. As illustrated, the boundary between the large cell 18 served by the HPN 12 and the small cell 20 served by the LPN 14 is not a simple boundary. Rather, the boundary includes a UL coverage edge 22 and a DL coverage edge 24. With respect to the wireless device 16-4, the UL coverage edge 22 is preferably determined based on path loss, and the DL coverage edge 24 is preferably determined based on received power at the wireless device 16-4. Thus, there are situations in which the lowest path loss is the path loss between the wireless device 16-4 and the LPN 14 but the highest received power at the wireless device 16-4 is the received power from the HPN 12. In this situation, it is beneficial for the wireless device 16-4 to operate in a decoupled UL and DL mode of operation in which a downlink to the wireless device 16-4 is transmitted by the HPN 12 but an uplink from the wireless device 16-4 is received and processed by the LPN 14. As such, the HPN 12 is also referred to herein as a downlink transmission node for the wireless device 16-4, and the LPN 14 is also referred to herein as an uplink reception node for the wireless device 16-4. Notably, the decoupled UL and DL mode of operation may also be used for Uplink Coordinated Multipoint (COMP) reception where the uplink from a wireless device 16 is received by multiple uplink reception nodes and processed in a coordinated manner.

Using conventional Physical Uplink Control Channel (PUCCH) transmission techniques for wireless devices, such as the wireless device 16-4, operating in a decoupled UL and DL mode of operation has several issues. In particular, while there is a backhaul connection between the HPN 12 and the LPN 14, it is not desirable for the HPN 12, or conversely the LPN 14, to perform both uplink and downlink scheduling because doing so would increase latency, network complexity, and load on the backhaul network. As such, it is preferable for downlink scheduling for the wireless device 16-4 to be performed by a downlink scheduler that is physically located at the HPN 12 or logically close to the HPN 12, and it is preferable for uplink scheduling for the wireless device 16-4 to be performed by an uplink scheduler that is physically located at the LPN 14 or logically close to the LPN 14. Further, because a PUCCH transmission can include both an uplink scheduling request that is needed by the uplink scheduler and a Hybrid Automatic Repeat Request (HARQ) acknowledgement that is needed by the downlink scheduler, a conventional PUCCH transmission from the wireless device 16-4 would need to be transmitted at a high power level in order to reach both the HPN 12 and the LPN 14, which leads to wasted power, unnecessary interference, and lack of PUCCH resource reuse.

Figure 14:
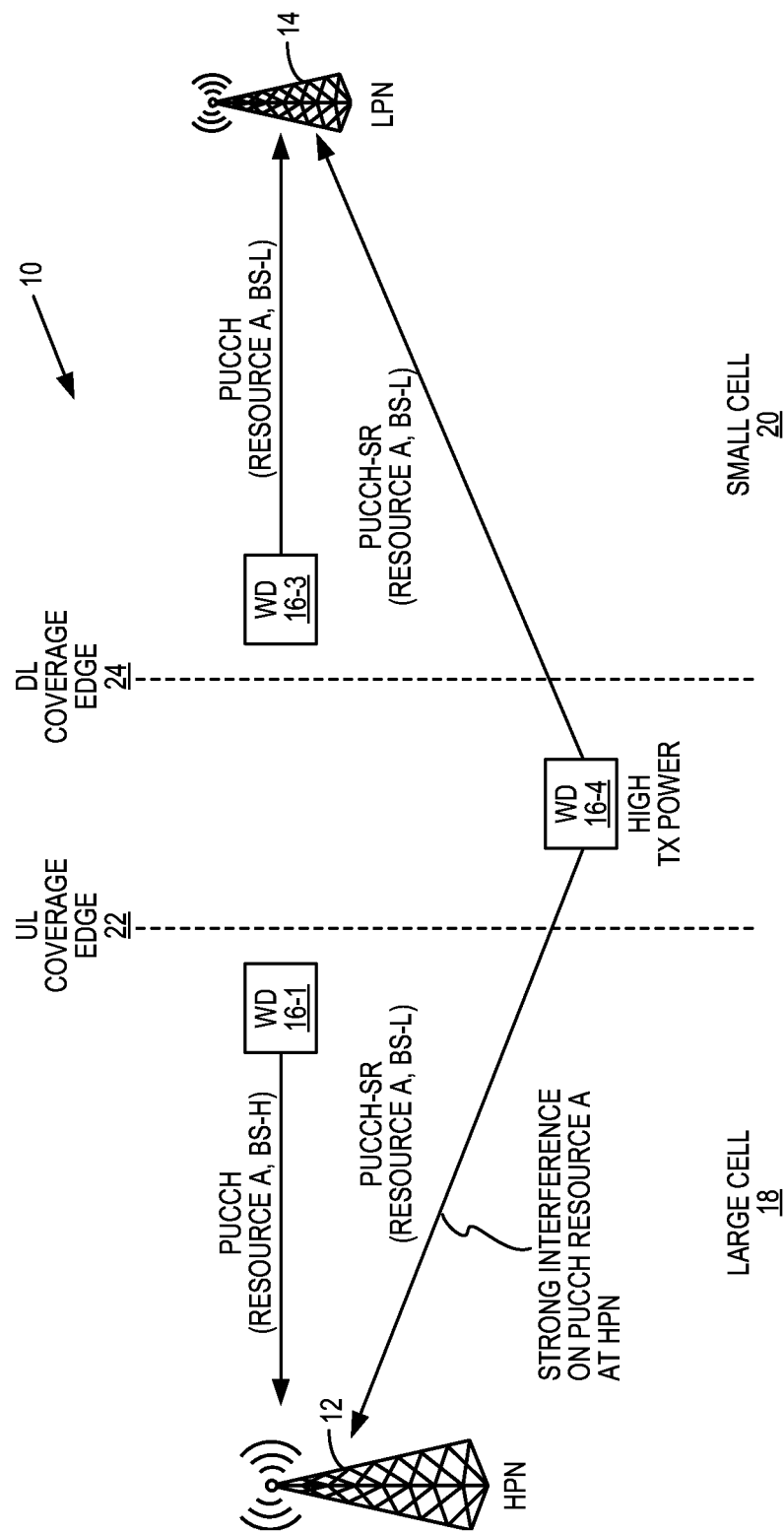
FIG. 14 illustrates issues that arise when using conventional PUCCH transmission schemes when the wireless device of FIG. 13 operates in the decoupled uplink and downlink mode of operation.

More specifically, as illustrated in FIG. 14, using a conventional PUCCH transmission scheme, the wireless device 16-4 transmits a PUCCH transmission that consists of an uplink Scheduling Request (SR) according to PUCCH format 1. The PUCCH transmission is on a PUCCH resource A and was generated according to PUCCH format 1 using a Base Sequence (BS-L). As a result, the PUCCH transmission creates strong interference at the HPN 12 with respect to a PUCCH transmission from the wireless device 16-1 using the same PUCCH resource A. Therefore, the high power transmission of the PUCCH by the wireless device 16-4 leads to a lack of area splitting gains as PUCCH resource A cannot be reused between the HPN 12 and the LPN 14. In addition, because the uplink scheduling request is only needed by the LPN 14, the high power transmission of the PUCCH by the wireless device 16-4 leads to a waste of power at the wireless device 16-4.

While the systems and methods disclosed herein are not limited to providing any particular benefit or advantage, the systems and methods disclosed herein can be utilized to provide PUCCH transmissions at a wireless device operating in a decoupled UL and DL mode of operation in such a manner as to address the problems discussed above. In particular, the systems and methods disclosed herein can be utilized to avoid wasted power and strong interference from unnecessary high power PUCCH transmissions and/or enables reuse of PUCCH resources between the HPN 12 and the LPN 14. As discussed below, embodiments of the systems and methods disclosed herein select values for one or more PUCCH parameters of a PUCCH format based on content to be transmitted in a PUCCH transmission according to the PUCCH format. In this manner, a PUCCH transmission that includes only content for the HPN 12 (e.g., only a HARQ acknowledgement or a channel status report) can be targeted to the HPN 12. Likewise, a PUCCH transmission that includes only content for the LPN 14 (e.g., only an uplink scheduling request) can be targeted to the LPN 14. A PUCCH transmission that includes content for both the HPN 12 and the LPN 14 (e.g., a HARQ acknowledgement and an uplink scheduling request) can be targeted to both the HPN 12 and the LPN 14.

In this regard, FIG. 15 is a flow chart that illustrates the operation of a wireless device 16 to transmit PUCCH according to one embodiment of the present disclosure. In this embodiment, the wireless device 16 is a wireless device 16 operating in a decoupled UL and DL mode of operation. As illustrated, the wireless device 16 first obtains multiple PUCCH parameter sets for targeting the uplink reception and downlink transmission nodes of the wireless device 16 (step 1000). In one embodiment, the wireless device 16 obtains the PUCCH parameter sets from the heterogeneous network 10 (e.g., from the HPN 12 and/or the LPN 14). Each PUCCH parameter set includes values for one or more PUCCH parameters that target the uplink reception node, the downlink transmission node, or both the uplink reception node and the downlink transmission node for the wireless device 16. More specifically, in one preferred embodiment, each PUCCH parameter set includes values for one or more PUCCH parameters for a corresponding PUCCH format that target the uplink reception node, the downlink transmission node, or both the uplink reception node and the downlink transmission node for the wireless device 16. For example, the PUCCH parameter sets can include a first PUCCH parameter set for uplink scheduling requests using PUCCH format 1, a second PUCCH parameter set for HARQ acknowledgements using PUCCH format 1, and a third PUCCH parameter set for combined uplink scheduling requests and HARQ acknowledgements using PUCCH format 1. In addition, the PUCCH parameter sets can include a fourth PUCCH parameter set for uplink scheduling requests using, for example, PUCCH format 3, a fifth PUCCH parameter set for HARQ acknowledgements using, for example, PUCCH format 3, and a sixth PUCCH parameter set for combined uplink scheduling requests and HARQ acknowledgements using, for example, PUCCH format 3. Still further, the PUCCH parameter sets can include one or more parameter sets for Carrier Aggregation (CA) PUCCH.

In one embodiment, at least some, but possibly all, of the PUCCH parameter sets include a value for a power control parameter. If the uplink reception node is to be targeted, the value for the power control parameter corresponds to a low transmit power level that is sufficient to reach the uplink reception node (i.e., the LPN 14) but not the downlink transmission node (i.e., the HPN 12). Conversely, if the downlink transmission node is to be targeted, the power control parameter corresponds to a high transmit power level that is sufficient to reach the downlink transmission node (i.e., the HPN 12). In this manner, unnecessary interference to the downlink transmission node is avoided for PUCCH transmissions that only include content for the uplink reception node (e.g., only include uplink scheduling requests). Notably, this power control parameter is to be distinguished from a power offset that can be used in 3GPP LTE to compensate for the different gains of the different coding schemes of the PUCCH formats.

In another embodiment, each PUCCH parameter set includes a value for one or more PUCCH parameters. All of PUCCH parameter sets can include values for the same PUCCH parameters or some or all of the PUCCH parameter sets can include values for different PUCCH parameters (e.g., PUCCH parameter sets for different PUCCH formats may include different PUCCH parameters). In one embodiment, the PUCCH parameters for the PUCCH parameter sets include a power control parameter, a base sequence, a cyclic shift (or phase rotation), a hopping pattern for the cyclic shift, an Orthogonal Cover Code (OCC), and/or a PUCCH resource block. Thus, for each PUCCH parameter set, the value(s) in the PUCCH parameter set include a value for the power control parameter, a value or index for the base sequence, a value or index for the cyclic shift, a value or index for the hopping pattern for the cyclic shift, a value or index for the OCC, and/or a value or index for the PUCCH resource block. As one example, different base sequences and scrambling sequences may be assigned to PUCCH parameter sets for PUCCH formats targeting the uplink reception node as compared to PUCCH parameter sets for PUCCH formats targeting the downlink transmission node. Furthermore, or alternatively, PUCCH parameter sets for PUCCH formats targeting the uplink reception node may be preferably assigned a different power level as compared to PUCCH parameter sets for PUCCH formats targeting the downlink transmission node.

Notably, as used herein, a value for the base sequence is a particular base sequence (i.e., a particular bit sequence), whereas an index for the base sequence is an index that identifies a particular base sequence. Likewise, a value for the cyclic shift is a particular cyclic shift, whereas an index for the cyclic shift is an index that identifies a particular cyclic shift. A value for the hopping pattern is a particular hopping pattern, whereas an index for the hopping pattern is an index that identifies a particular hopping pattern. A value for the OCC is a particular OCC, whereas an index for the OCC is an index that identifies a particular OCC. Lastly, a value for the PUCCH resource block is a value that identifies or otherwise corresponds to a particular PUCCH resource block.

In one embodiment, the PUCCH parameter sets are defined to target the appropriate uplink reception and/or downlink transmission nodes by setting the transmit power appropriately while also enabling reuse of PUCCH resources. Reuse of PUCCH resources is enabled by configuring the base sequence, cyclic shift, hopping pattern for the cyclic shift, and/or OCC such the PUCCH transmissions from the wireless device 16 can be multiplexed with PUCCH transmissions from other wireless devices 16 using the same PUCCH resource blocks. Notably, there are two preferred options for multiplexing PUCCH transmissions from different wireless devices 16, namely, making the PUCCH transmissions from the wireless device 16 and the other wireless devices 16 orthogonal or semi-orthogonal. PUCCH transmissions in the same PUCCH format can be made orthogonal by using the same base sequence and cyclic shift hopping pattern with different cyclic shifts and/or OCCs. There are a limited number of orthogonal PUCCH resources. PUCCH transmissions in the same PUCCH format can be made semi-orthogonal by using different base sequences and/or different cyclic shift hopping patterns in order to randomize their mutual interference (this is also referred to as pseudo orthogonally). There are a larger number of semi-orthogonal PUCCH resources, but mutual interference is stronger than for orthogonal PUCCH resources. Thus, by selecting appropriate PUCCH resources, the PUCCH transmissions from the wireless device 16 can be targeted to the appropriate uplink reception node and/or the downlink transmission node via power control while at the same time enable reuse of PUCCH resources between the uplink reception node and the downlink transmission node via appropriate base sequences, cyclic shifts, cyclic shift hopping patterns, and/or OCCs.

After obtaining the PUCCH parameter sets, the wireless device 16 selects one of the PUCCH parameter sets based on content to be transmitted in a PUCCH transmission according to a PUCCH format (step 1002). In one preferred embodiment, the wireless device 16 selects the PUCCH parameter set based on both the content for the PUCCH transmission and the PUCCH format for the PUCCH transmission. The selected PUCCH parameter set targets the uplink reception node for the wireless device 16, the downlink transmission node for the wireless device 16, or both the uplink reception node and the downlink transmission node for the wireless device 16 as appropriate for the content for the PUCCH transmission. More specifically, in one preferred embodiment, the selected PUCCH parameter set targets the uplink reception node if the content for the PUCCH transmission is only an uplink scheduling request, targets the downlink transmission node if the content for the PUCCH transmission is only a HARQ acknowledgement(s) or a channel status report, and targets both the uplink reception node and the downlink transmission node if the content for the PUCCH transmission is a combined uplink scheduling request and HARQ acknowledgement(s). Thus, in one embodiment, the wireless device 16 selects the PUCCH parameter set by first determining whether the content for the PUCCH transmission targets the uplink reception node (e.g., the content is an uplink scheduling request), targets the downlink transmission node (e.g., the content is a HARQ acknowledgement or a channel status report), or targets both the uplink reception node and the downlink transmission node (e.g., the content is both an uplink scheduling request and a HARQ acknowledgment). Then, the wireless device 16 selects the appropriate set of PUCCH parameters to target the appropriate node(s). Lastly, the wireless device 16 transmits the PUCCH transmission using the selected PUCCH parameter set for the PUCCH format (step 1004).

FIG. 16 is a more detailed illustration of step 1002 of FIG. 15 according to one embodiment of the present disclosure. In order to select the PUCCH parameter set, the wireless device 16 determines the content for the PUCCH transmission (step 2000). Next, the wireless device 16 determines whether the content is an uplink scheduling request only (step 2002). If so, the wireless device 16 selects a PUCCH parameter set for the PUCCH format of the PUCCH transmission that targets the uplink reception node (2004). If not, the wireless device 16 determines whether the content is a HARQ acknowledgement(s) only (step 2006). If so, the wireless device 16 selects a PUCCH parameter set for the PUCCH format of the PUCCH transmission that targets the downlink transmission node (step 2008).

If the content is not a HARQ acknowledgement(s) only, the wireless device 16 determines whether the content is a channel status report only (step 2010). If so, the wireless device 16 selects a PUCCH parameter set for the PUCCH format of the PUCCH transmission that targets the downlink transmission node (step 2012). If the content is not a channel status report, then, in this example, the content is assumed to be a combined uplink scheduling request and HARQ acknowledgement(s). As such, the wireless device 16 selects a PUCCH parameter set for the PUCCH format of the PUCCH transmission that targets both the uplink reception node and the downlink transmission node (step 2014). Thus, as an example, when using the process of FIG. 16, the PUCCH parameter values used for PUCCH format 1 for an uplink scheduling request are different than the PUCCH parameter values used for PUCCH format 1 for a HARQ acknowledgement. Notably, while FIG. 16 illustrates a decision based process for selecting the appropriate PUCCH parameter set, in an alternative embodiment, the PUCCH parameter sets are indexed by content and, in some embodiments, PUCCH format. Then, using the content for the PUCCH transmission and the PUCCH format for the PUCCH transmission as an index, the appropriate PUCCH parameter set can be selected from the PUCCH parameter sets.

FIGS. 17 through 19 illustrate the operation of the wireless device 16-4, the HPN 12, and the LPN 14 of FIG. 13 where the wireless device 16-4 selects a PUCCH parameter set according to the process of FIG. 16 according to one embodiment of the present disclosure. As illustrated in FIG. 17, the HPN 12 and the LPN 14 coordinate PUCCH (step 3000). More specifically, the HPN 12 and the LPN 14 coordinate PUCCH parameters and PUCCH resources for the wireless device 16-4. The PUCCH parameters and the PUCCH resources can be coordinated to enable multiplexing of PUCCH transmissions by the wireless device 16-4 with PUCCH transmissions to the HPN 12 and/or PUCCH transmissions to the LPN 14 on the same PUCCH resources. For instance, the HPN 12 and the LPN 14 can coordinate PUCCH such that orthogonally or semi-orthogonally is maintained between PUCCH transmissions from the wireless device 16-4 and PUCCH transmissions from other wireless devices 16 to the HPN 12 and/or to the LPN 14 using the same PUCCH resources.

In addition, for situations where a PUCCH transmission is targeted to both the HPN 12 and the LPN 14, both the HPN 12 and the LPN 14 need to know the values for the PUCCH parameters used for the PUCCH transmission. Thus, coordination of PUCCH may also enable both the HPN 12 and the LPN 14 to know the PUCCH parameter values (e.g., base sequence, cyclic shift, cyclic shift hopping pattern, and/or OCC) used by the wireless device 16-4 for a PUCCH transmission that targets both the HPN 12 and the LPN 14 to thereby enable successful reception of the PUCCH transmission at both the HPN 12 and the LPN 14.

Notably, in one embodiment, when coordinating PUCCH, the HPN 12 and/or the LPN 14 may assign PUCCH resources to avoid combined uplink scheduling requests and HARQ acknowledgements. In this manner, PUCCH transmissions target only the uplink reception node or only the downlink transmission node but not both the uplink reception node and the downlink transmission node. For example, the wireless device 16-4 may be configured to avoid encoding of a scheduling request in PUCCH format 3 or format 1a/1b and, instead, send independent PUCCH transmissions according to the appropriate PUCCH format(s). In one embodiment, these independent PUCCH transmissions can be multiplexed in the same subframe in order to reduce the impact on the cubic metric (i.e., in order to control the dynamic range of the transmitted signal) and in order to reduce intermodulation effect. In another embodiment, these independent PUCCH transmissions can be transmitted on different resources (e.g., different OFDM symbols, slots, or subframes).

In this embodiment, the HPN 12 provides the PUCCH parameter sets to the wireless device 16-4 (step 3002). The wireless device 16-4 determines that the content for an upcoming PUCCH transmission is an uplink scheduling request (step 3004). As such, the wireless device 16-4 selects a PUCCH parameter set for an appropriate PUCCH format that targets the uplink reception node for the wireless device 16-4, which in this embodiment is the LPN 14 (step 3006). Here, the appropriate PUCCH format is PUCCH format 1. The wireless device 16-4 then transmits a PUCCH transmission according to PUCCH format 1 using the selected PUCCH parameter set (step 3008). Since the PUCCH transmission targets the LPN 14, the LPN 14 receives and processes the PUCCH transmission (step 3010). Since the PUCCH transmission includes the uplink scheduling request, the uplink scheduler at or logically near the LPN 14 processes the uplink scheduling request to schedule resources for the uplink from the wireless device 16-4 to the LPN 14.

FIG. 18 is similar to FIG. 17 but where the content for the PUCCH transmission is a HARQ acknowledgement only. As illustrated in FIG. 18, the HPN 12 and the LPN 14 coordinate PUCCH as discussed above (step 4000). Next, in this embodiment, the HPN 12 provides the PUCCH parameter sets to the wireless device 16-4 (step 4002). The wireless device 16-4 determines that the content for an upcoming PUCCH transmission is a HARQ acknowledgement (i.e., a HARQ ACK or a HARQ NACK) (step 4004). As such, the wireless device 16-4 selects a PUCCH parameter set for an appropriate PUCCH format that targets the downlink transmission node for the wireless device 16-4, which in this embodiment is the HPN 12 (step 4006). Here, the appropriate PUCCH format is PUCCH format 1. The wireless device 16-4 then transmits a PUCCH transmission according to PUCCH format 1 using the selected PUCCH parameter set (step 4008). Since the PUCCH transmission targets the HPN 12, the HPN 12 receives and processes the PUCCH transmission (step 4010). Since the PUCCH transmission includes the HARQ acknowledgement, the HPN 12 processes the received HARQ acknowledgement according to the HARQ scheme of the HPN 12.

FIG. 19 is similar to FIGS. 17 and 18 but where the content for the PUCCH transmission is both an uplink SR and a HARQ acknowledgement. As illustrated in FIG. 19, the HPN 12 and the LPN 14 coordinate PUCCH as discussed above (step 5000). Next, in this embodiment, the HPN 12 provides the PUCCH parameter sets to the wireless device 16-4 (step 5002). The wireless device 16-4 determines that the content for an upcoming PUCCH transmission is both an uplink scheduling request and a HARQ acknowledgement (step 5004). As such, the wireless device 16-4 selects a PUCCH parameter set for an appropriate PUCCH format that targets both the uplink reception node and the downlink transmission node for the wireless device 16-4, which in this embodiment are the LPN 14 and the HPN 12, respectively (step 5006). Here, the appropriate PUCCH format is PUCCH format 1. The wireless device 16-4 then transmits a PUCCH transmission according to PUCCH format 1 using the selected PUCCH parameter set (step 5008). Since the PUCCH transmission targets both the LPN 14 and the HPN 12, the LPN 14 and the HPN 12 both receive and process the PUCCH transmission (steps 5010 and 5012). Since the PUCCH transmission includes the HARQ acknowledgement, the HPN 12 processes the received ACK or NACK according to the HARQ scheme of the HPN 12. Conversely, the uplink scheduler at or logically near the LPN 14 processes the uplink scheduling request to schedule resources for the uplink from the wireless device 16-4 to the LPN 14.

FIGS. 20A and 20B illustrate one example of the selection of the PUCCH parameters to target either the downlink transmission node (i.e., the HPN 12) or the uplink reception node (i.e., the LPN 14) and also enable multiplexing of the PUCCH transmission from the wireless device 16-4 with PUCCH transmissions from other wireless device(s) 16 on the same PUCCH resource according to one embodiment of the present disclosure. In FIG. 20A, the wireless device 16-4 transmits a PUCCH transmission that targets the LPN 14 (e.g., a PUCCH transmission including only an uplink SR). The PUCCH transmission is on PUCCH resource A. In order to target the LPN 14, the wireless device 16 transits the PUCCH transmission at a low power level such that the PUCCH transmission reaches the LPN 14 but not the HPN 12. In addition, the PUCCH transmission uses a base sequence (BS-L). The PUCCH transmission from the wireless device 16-4 can be multiplexed with a PUCCH transmission from the wireless device 16-3 to the LPN 14 on the same PUCCH resource A by, for example, using a cyclic shift and/or an OCC that is different that than used for the PUCCH transmission from the wireless device 16-3 to the LPN 14 on the PUCCH resource A. Because the PUCCH transmission from the wireless device 16-4 is at a low power level, strong interference at the HPN 12 to a PUCCH transmission from the wireless device 16-1 on the same PUCCH resource A is avoided.

As illustrated in FIG. 20B, the wireless device 16-4 transmits a PUCCH transmission that targets the HPN 12 (e.g., a PUCCH format 1 transmission that includes only a HARQ acknowledgement) on PUCCH resource A. In order to target the HPN 12, the wireless device 16-4 transmits the PUCCH transmission at a high power level. In this example, the PUCCH transmission from the wireless device 16-4 is multiplexed with a PUCCH transmission from the wireless device 16-1 on the same PUCCH resource A by using a different base sequence than that used for the PUCCH transmission from the wireless device 16-1. In addition, other PUCCH parameters (e.g., cyclic shift hopping pattern) used for the PUCCH transmission from the wireless device 16-4 may be different than those used for the PUCCH transmission from the wireless device 16-1 to further reduce mutual interference. Because the PUCCH transmission from the wireless device 16-4 is at a high power level, there is a potential for strong interference to a PUCCH transmission from the wireless device 16-3 to the LPN 14 on the same PUCCH resource A and, in this example, using the same base sequence. Mutual interference between these two PUCCH transmissions can be reduced by, for example, assigning different cycle shifts and/ or different OCCs to the PUCCH transmissions.

FIGS. 21A and 21B illustrate one example of the selection of the PUCCH parameters to target either the downlink transmission node (i.e., the HPN 12) or the uplink reception node (i.e., the LPN 14) and also enable multiplexing of the PUCCH transmission from the wireless device 16-4 with PUCCH transmissions from other wireless device(s) 16 according to another embodiment of the present disclosure. In FIG. 21A, the wireless device 16-4 transmits a PUCCH transmission that targets the LPN 14 (e.g., a PUCCH transmission including only an uplink scheduling request). The PUCCH transmission is on PUCCH resource A. In order to target the LPN 14, the wireless device 16 transits the PUCCH transmission at a low power level such that the PUCCH transmission reaches the LPN 14 but not the HPN 12. In addition, the PUCCH transmission uses a base sequence (BS-L). The PUCCH transmission from the wireless device 16-4 can be multiplexed with a PUCCH transmission from the wireless device 16-3 to the LPN 14 on the same PUCCH resource A by, for example, using a cyclic shift and/or an OCC that is different that than used for the PUCCH transmission from the wireless device 16-3 to the LPN 14 on the PUCCH resource A. Because the PUCCH transmission from the wireless device 16-4 is at a low power level, strong interference at the HPN 12 to a PUCCH transmission from the wireless device 16-1 on the same PUCCH resource A is avoided.

As illustrated in FIG. 21B, the wireless device 16-4 transmits a PUCCH transmission that targets the HPN 12 (e.g., a PUCCH format 1 transmission that includes only a HARQ acknowledgement) on PUCCH resource B. In order to target the HPN 12, the wireless device 16-4 transmits the PUCCH transmission at a high power level. In this example, the PUCCH transmission from the wireless device 16-4 is multiplexed with a PUCCH transmission from the wireless device 16-2 on the same PUCCH resource B by using a different base sequence than that used for the PUCCH transmission from the wireless device 16-2. In addition, other PUCCH parameters (e.g., cyclic shift hopping pattern) used for the PUCCH transmission from the wireless device 16-4 may be different than those used for the PUCCH transmission from the wireless device 16-2 to further reduce mutual interference. Because the PUCCH transmission from the wireless device 16-4 is at a high power level, there is a potential for strong interference to a PUCCH transmission to the LPN 14. In this example, strong interference is avoided by assigning a PUCCH transmission from the wireless device 16-3 to the LPN 14 to a different PUCCH resource, which in this example is PUCCH resource A.

FIG. 22 illustrates a closed loop power control scheme for PUCCH transmissions that contain only uplink scheduling requests according to one embodiment of the present disclosure. This closed loop power control scheme can be utilized to control transmit power for PUCCH transmissions that contain only uplink SRs such that those PUCCH transmissions reach the LPN 14 but not the HPN 12. This closed loop power control scheme is separate from power control for feedback of HARQ ACK/NACK and/or Channel State Information (CSI) reports. As illustrated, the wireless device 16-4 transmits a PUCCH transmission that includes only an uplink SR and is therefore targeted to the LPN 14 (step 6000). The LPN 14 determines a value for a closed loop power control parameter for PUCCH transmissions from the wireless device 16-4 that include uplink SRs only (step 6002). More specifically, the LPN 14 determines or updates the value for the closed loop power control parameter in such a manner as to increase, decrease, or maintain the transmit power level of the wireless device 16-4 for PUCCH transmissions including uplink SRs only such that those PUCCH transmissions reach the LPN 14 but do not reach the HPN 12. Notably, the closed loop power control parameter can be a semi-static parameter that is updated infrequently. In this case, the value for the closed loop power control parameter can be determined using a most recent PUCCH transmission from the wireless device 16-4 that contains only an uplink SR or can be determined based on multiple previous PUCCH transmissions from the wireless device 16-4 that contain only uplink SRs.

In this example, the LPN 14 sends the value for the closed loop power control parameter to the HPN 12 (step 6004), which in turn sends the value for the closed loop power control parameter to the wireless device 16-4 (step 6006). In one particular embodiment, the HPN 12 sends the value for the closed loop power control parameter to the wireless device 16-4 using Radio Resource Control (RRC) signaling. The wireless device 16-4 subsequently transmits a PUCCH transmission that contains only an uplink SR at a power level that corresponds to the value for the closed loop power control parameter (step 6008). This process continues to provide closed loop power control for the PUCCH transmissions from the wireless device 16-4 that contain only uplink SRs.

FIG. 23 is a block diagram of one embodiment of the HPN 12. As illustrated, the HPN 12 includes a radio subsystem 26 and a processing subsystem 28. While only one radio subsystem 26 is illustrated, the HPN 12 may include multiple radio subsystems 26 (e.g., one radio subsystem 26 per sector). The radio subsystem 26 generally includes analog and, in some embodiments, digital components for sending and receiving data to and from wireless devices 16 within the corresponding cell. In particular embodiments, the radio subsystem 26 may represent or include one or more Radio Frequency (RF) transceiver(s), or separate RF transmitter(s) and receiver(s), capable of transmitting suitable information wirelessly to and receiving suitable information from other network components or nodes. From a wireless communications protocol view, the radio subsystem 26 implements at least part of Layer 1 (i.e., the Physical or "PHY" Layer).

The processing subsystem 28 generally implements any remaining portion of Layer 1 not implemented in the radio subsystem 26 as well as functions for higher layers in the wireless communications protocol (e.g., Layer 2 (data link layer), Layer 3 (network layer), etc.). In particular embodiments, the processing subsystem 28 may comprise, for example, one or several general-purpose or special-purpose microprocessors or other microcontrollers programmed with suitable software and/or firmware to carry out some or all of the functionality of the HPN 12 described herein. In addition or alternatively, the processing subsystem 28 may comprise various digital hardware blocks (e.g., one or more Application Specific Integrated Circuits (ASICs), one or more off-the-shelf digital and analog hardware components, or a combination thereof) configured to carry out some or all of the functionality of the HPN 12 described herein. Additionally, in particular embodiments, the above described functionality of the HPN 12 may be implemented, in whole or in part, by the processing subsystem 28 executing software or other instructions stored on a non-transitory computer-readable medium, such as Random Access Memory (RAM), Read Only Memory (ROM), a magnetic storage device, an optical storage device, or any other suitable type of data storage components. While not illustrated, the HPN 12 also includes communication interfaces that provide connectivity between the HPN 12 and other network nodes (e.g., other HPNs, the LPN 14, and/or a core network) as appropriate.

FIG. 24 is a block diagram of one embodiment of the LPN 14. As illustrated, the LPN 14 includes a radio subsystem 30 and a processing subsystem 32. While only one radio subsystem 30 is illustrated, the LPN 14 may include multiple radio subsystems 30 (e.g., one radio subsystem 30 per sector). The radio subsystem 30 generally includes analog and, in some embodiments, digital components for sending and receiving data to and from wireless devices 16 within the corresponding cell. In particular embodiments, the radio subsystem 30 may represent or include one or more RF transceiver(s), or separate RF transmitter(s) and receiver(s), capable of transmitting suitable information wirelessly to and receiving suitable information from other network components or nodes. From a wireless communications protocol view, the radio subsystem 30 implements at least part of Layer 1 (i.e., the Physical or "PHY" Layer).

The processing subsystem 32 generally implements any remaining portion of Layer 1 not implemented in the radio subsystem 30 as well as functions for higher layers in the wireless communications protocol (e.g., Layer 2 (data link layer), Layer 3 (network layer), etc.). In particular embodiments, the processing subsystem 32 may comprise, for example, one or several general-purpose or special-purpose microprocessors or other microcontrollers programmed with suitable software and/or firmware to carry out some or all of the functionality of the LPN 14 described herein. In addition or alternatively, the processing subsystem 32 may comprise various digital hardware blocks (e.g., one or more ASICs, one or more off-the-shelf digital and analog hardware components, or a combination thereof) configured to carry out some or all of the functionality of the LPN 14 described herein. Additionally, in particular embodiments, the above described functionality of the LPN 14 may be implemented, in whole or in part, by the processing subsystem 32 executing software or other instructions stored on a non-transitory computer-readable medium, such as RAM, ROM, a magnetic storage device, an optical storage device, or any other suitable type of data storage components. While not illustrated, the LPN 14 also includes communication interfaces that provide connectivity between the LPN 14 and other network nodes (e.g., other LPNs, the HPN 12, and/or a core network) as appropriate.

FIG. 25 is a block diagram of one embodiment of the wireless device 16. As illustrated, the wireless device 16 includes a radio subsystem 34 and a processing subsystem 36. The radio subsystem 34 includes one or more transceivers generally including analog and, in some embodiments, digital components for sending and receiving data to and from the HPN 12 and/or the LPN 14. In particular embodiments, each of the one or more transceivers may represent or include one or more RF transceivers, or separate RF transmitter(s) and receiver(s), capable of transmitting suitable information wirelessly to and receiving suitable information from other network components or nodes. From a wireless communications protocol view, the radio subsystem 34 implements at least part of Layer 1 (i.e., the Physical or "PHY" Layer).

The processing subsystem 36 generally implements any remaining portion of Layer 1 as well as functions for higher layers in the wireless communications protocol (e.g., Layer 2 (data link layer), Layer 3 (network layer), etc.). In particular embodiments, the processing subsystem 36 may comprise, for example, one or several general-purpose or special-purpose microprocessors or other microcontrollers programmed with suitable software and/or firmware to carry out some or all of the functionality of the wireless device 16 described herein. In addition or alternatively, the processing subsystem 36 may comprise various digital hardware blocks (e.g., one or more ASICs, one or more off-the-shelf digital and analog hardware components, or a combination thereof) configured to carry out some or all of the functionality of the wireless device 16 described herein. Additionally, in particular embodiments, the above described functionality of the wireless device 16 may be implemented, in whole or in part, by the processing subsystem 36 executing software or other instructions stored on a non-transitory computer-readable medium, such as RAM, ROM, a magnetic storage device, an optical storage device, or any other suitable type of data storage components. Of course, the detailed operation for each of the functional protocol layers, and thus the radio subsystem 34 and the processing subsystem 36, will vary depending on both the particular implementation as well as the standard or standards supported by the wireless device 16.

The following acronyms are used throughout this disclosure.

3GPP 3$^{rd}$ Generation Partnership Project
ACK Acknowledgement
ASIC Application Specific Integrated Circuit
BPSK Binary Phase Shift Keying
BS Base Sequence
CA Carrier Aggregation
CAZAC Constant Amplitude Zero AutoCorrelation
CC Component Carrier
CCE Control Channel Element
CIF Carrier Indicator Field
CoMP Coordinated Multipoint
CSI Channel State Information
dB Decibel
DCI Downlink Control Information
DFT Discrete Fourier Transform
DFTS Discrete Fourier Transform Spread
DL Downlink
DL PCC Downlink Primary Component Carrier
eNB eNodeB
ePDCCH Enhanced Physical Downlink Control Channel
FDD Frequency Division Duplexing
HARQ Hybrid Automatic Repeat Request
HPN High Power Node
IE Information Element
LTE Long Term Evolution
LPN Low Power Node
MAC Media Access Control
MHz Megahertz
ms Millisecond
NACK Non-Acknowledgement
OCC Orthogonal Cover Code
OFDM Orthogonal Frequency Division Multiplexing
PDCCH Physical Downlink Control Channel
PDSCH Physical Downlink Shared Channel
PUCCH Physical Uplink Control Channel
QPSK Quadrature Phase Shift Keying
RAM Random Access Memory
RF Radio Frequency
ROM Read Only Memory
RRC Radio Resource Control
SCC Secondary Component Carrier
SR Scheduling Request
TDD Time Division Duplexing
TPC Transmit Power Control
TS Technical Specification
UL Uplink
UL PCC Uplink Primary Component Carrier
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A wireless device configured to operate in a cellular communications network, comprising:
   a radio subsystem; and
   a processing subsystem associated with the radio subsystem configured to, for a decoupled uplink and downlink mode of operation:
      determine whether content for an uplink control channel transmission to be transmitted according to an uplink control channel format is targeted to an uplink reception node serving the wireless device or to a downlink transmission node serving the wireless device;
      select a first value for at least one parameter for the uplink control channel format, wherein the first value is associated with transmissions targeting the uplink reception node, if the content is targeted to the uplink reception node;
      select a second value for the at least one parameter for the uplink control channel format, wherein the second value is associated with transmissions targeting the downlink transmission node, if the content is targeted to the downlink transmission node; and
      transmit the content in the uplink control channel transmission according to the uplink control channel format and the first value or the second value for the at least one parameter for the uplink control channel format selected based on the content.

2. The wireless device of claim 1 wherein the uplink control channel format is a physical uplink control channel format such that the at least one parameter for the uplink control channel format is at least one parameter for the physical uplink control channel format.

3. The wireless device of claim 2 wherein the at least one parameter for the physical uplink control channel format comprises a power control parameter.

4. The wireless device of claim 2 wherein the at least one parameter for the physical uplink control channel format comprises a base sequence.

5. The wireless device of claim 2 wherein the at least one parameter for the physical uplink control channel format comprises at least one of a cyclic shift hopping pattern and a cyclic shift.

6. The wireless device of claim 2 wherein the at least one parameter for the physical uplink control channel format comprises an orthogonal cover code.

7. The wireless device of claim 2 wherein the at least one parameter for the physical uplink control channel format comprises a physical uplink control channel resource block.

8. A wireless device configured to operate in a cellular communications network, comprising:
  a radio subsystem; and
  a processing subsystem associated with the radio subsystem configured to, for a decoupled uplink and downlink mode of operation:
    determine that content for an uplink control channel transmission to be transmitted according to a physical uplink control channel format is an uplink scheduling request;
    in response to determining that the content is an uplink scheduling request, select a first value for at least one parameter for the physical uplink control channel format, wherein the first value is associated with transmissions targeted to an uplink reception node for the wireless device in the decoupled uplink and downlink mode of operation; and
    transmit the content in the uplink control channel transmission according to the physical uplink control channel format and the first value for the at least one parameter for the physical uplink control channel format selected based on the content.

9. The wireless device of claim 8 wherein the first value for the at least one parameter for the physical uplink control channel format enables multiplexing of the uplink control channel transmission with another uplink control channel transmission from another wireless device to the uplink reception node on the same physical uplink control channel resource.

10. A wireless device configured to operate in a cellular communications network, comprising:
  a radio subsystem; and
  a processing subsystem associated with the radio subsystem configured to, for a decoupled uplink and downlink mode of operation:
    determine that content for an uplink control channel transmission to be transmitted according to a physical uplink control channel format is a Hybrid Automatic Repeat Request Acknowledgement/Non-Acknowledgement;
    in response to determining that the content is a Hybrid Automatic Repeat Request Acknowledgement/Non-Acknowledgement, select a first value for at least one parameter for the physical uplink control channel format, wherein the first value is associated with transmissions targeted to a downlink transmission node for the wireless device in the decoupled uplink and downlink mode of operation; and
    transmit the content in the uplink control channel transmission according to the physical uplink control channel format and the first value for the at least one parameter for the physical uplink control channel format selected based on the content.

11. The wireless device of claim 10 wherein the first value for the at least one parameter for the physical uplink control channel format enables multiplexing of the uplink control channel transmission with another uplink control channel transmission from another wireless device to the downlink transmission node on the same physical uplink control channel resource.

12. A wireless device configured to operate in a cellular communications network, comprising:
  a radio subsystem; and
  a processing subsystem associated with the radio subsystem configured to, for a decoupled uplink and downlink mode of operation:
    determine that content for an uplink control channel transmission to be transmitted according to a physical uplink control channel format comprises an uplink scheduling request and a Hybrid Automatic Repeat Request Acknowledgement/Non-Acknowledgement;
    in response to determining that the content comprises an uplink scheduling request and a Hybrid Automatic Repeat Request Acknowledgement/Non-Acknowledgement, select a first value for at least one parameter for the physical uplink control channel format, wherein the first value is associated with transmissions targeted to both the uplink reception node and a downlink transmission node for the wireless device in the decoupled uplink and downlink mode of operation; and
    transmit the content in the uplink control channel transmission according to the physical uplink control channel format and the first value for the at least one parameter for the physical uplink control channel format selected based on the content.

13. The wireless device of claim 12 wherein the first value for the at least one parameter for the physical uplink control channel format enables multiplexing of the uplink control channel transmission with another uplink control channel transmission from another wireless device to the downlink transmission node on the same physical uplink control channel resource.

14. The wireless device of claim 12 wherein the first value for the at least one parameter for the physical uplink control channel format enables multiplexing of the uplink control channel transmission with another uplink control channel transmission from another wireless device to the uplink reception node on the same physical uplink control channel resource.

15. A wireless device configured to operate in a cellular communications network, comprising:
  a radio subsystem; and
  a processing subsystem associated with the radio subsystem configured to, for a decoupled uplink and downlink mode of operation:
    obtain a plurality of physical uplink control channel parameter value sets; and
    select one of the plurality of physical uplink control channel parameter value sets based on content for an uplink control channel transmission to be transmitted according to a physical uplink control channel format to thereby select a value for at least one parameter for the physical uplink control channel format; and
    transmit the content in the uplink control channel transmission according to the physical uplink control channel format and the value for the at least one parameter for the physical uplink control channel format selected based on the content.

16. The wireless device of claim 15 where the plurality of physical uplink control channel parameter value sets comprises at least one first set of physical uplink control channel parameter values that targets an uplink reception node for the wireless device in the decoupled uplink and downlink mode of operation and at least one second set of physical uplink control channel parameter values that targets a downlink transmission node for the wireless device in the decoupled uplink and downlink mode of operation.

17. A method of operation of a wireless device in a decoupled uplink and downlink mode of operation in a cellular communications network, comprising:
  determining whether content for an uplink control channel transmission to be transmitted according to an uplink control channel format is targeted to an uplink reception node serving the wireless device or to a downlink transmission node serving the wireless device;

selecting a first value for at least one parameter for the uplink control channel format, wherein the first value is associated with transmissions targeting the uplink reception node, if the content is targeted to the uplink reception node; and selecting a second value for the at least one parameter for the uplink control channel format, wherein the second value is associated with transmissions targeting the downlink transmission node, if the content is targeted to the downlink transmission node; and transmitting the content in the uplink control channel transmission according to the uplink control channel format and the first value or the second value for the at least one parameter for the uplink control channel format selected based on the content.

* * * * *

UNITED STATES PATENT AND TRADEMARK OFFICE
CERTIFICATE OF CORRECTION

| | |
|---|---|
| PATENT NO. | : 9,265,036 B2 |
| APPLICATION NO. | : 13/891286 |
| DATED | : February 16, 2016 |
| INVENTOR(S) | : Sorrentino et al. |

Page 1 of 1

It is certified that error appears in the above-identified patent and that said Letters Patent is hereby corrected as shown below:

On the Title Page, in item (74), under "Attorney, Agent, or Firm", in Column 2, Line 1, delete "Winthrow" and insert -- Withrow --, therefor.

In the Specification

In Column 11, Line 22, delete "devicel 6-3," and insert -- device 16-3, --, therefor.

In Column 11, Line 60, delete "(COMP)" and insert -- (CoMP) --, therefor.

Signed and Sealed this
Fourteenth Day of June, 2016

Michelle K. Lee
*Director of the United States Patent and Trademark Office*